(12) United States Patent
Lim et al.

(10) Patent No.: US 11,671,943 B2
(45) Date of Patent: Jun. 6, 2023

(54) TECHNIQUES FOR ALLOCATING A RESOURCE UNIT IN WIRELESS LOCAL AREA NETWORK SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 17/223,974

(22) Filed: Apr. 6, 2021

(65) Prior Publication Data

US 2021/0314922 A1 Oct. 7, 2021

Related U.S. Application Data

(60) Provisional application No. 63/014,731, filed on Apr. 24, 2020.

(30) Foreign Application Priority Data

Apr. 6, 2020 (KR) .................. 10-2020-0041684
May 20, 2020 (KR) .................. 10-2020-0060459

(51) Int. Cl.
*H04W 4/00* (2018.01)
*H04W 72/04* (2023.01)
*H04L 5/00* (2006.01)
*H04W 84/12* (2009.01)

(52) U.S. Cl.
CPC ............ *H04W 72/04* (2013.01); *H04L 5/0044* (2013.01); *H04W 84/12* (2013.01)

(58) Field of Classification Search
CPC ............... H04W 72/04; H04W 84/12; H04W 72/042; H04W 72/0453; H04L 5/0044; H04L 5/0091
See application file for complete search history.

(56) References Cited

U.S. PATENT DOCUMENTS

| | | | | |
|---|---|---|---|---|
| 2011/0274197 A1* | 11/2011 | Zhu | ................... | H04L 1/0031 |
| | | | | 375/267 |
| 2016/0156438 A1* | 6/2016 | Sun | ................... | H04L 5/0007 |
| | | | | 370/330 |
| 2017/0026151 A1* | 1/2017 | Adachi | ............ | H04W 72/0453 |
| 2017/0150493 A1* | 5/2017 | Seok | ................... | H04B 7/0452 |
| 2017/0339701 A1* | 11/2017 | Choi | ................... | H04L 5/00 |
| 2019/0254034 A1* | 8/2019 | Liu | ................... | H04L 1/0052 |
| 2020/0177425 A1* | 6/2020 | Chen | .................. | H04L 27/2602 |

(Continued)

*Primary Examiner* — Atique Ahmed
(74) *Attorney, Agent, or Firm* — Lee Hong Degerman Kang Waimey

(57) ABSTRACT

According to various embodiments, a receiving STA may receive a Physical layer Protocol Data Unit (PPDU) including a first signal field and a second signal field, wherein the first signal field includes 3 bit information related to a version of the PPDU, wherein the second signal field includes 10 bit information related to a configuration of a plurality of resource units (RUs), wherein first bit information of the 10 bit information includes information for determining the configuration as one of a first configuration and a second configuration. Further, the receiving STA may decode the PPDU based on the first signal field and the second signal field.

11 Claims, 41 Drawing Sheets

(56) References Cited

U.S. PATENT DOCUMENTS

| | | | |
|---|---|---|---|
| 2020/0228380 A1* | 7/2020 | Yang | H04L 27/2621 |
| 2021/0227529 A1* | 7/2021 | Chu | H04W 72/0406 |
| 2021/0281384 A1* | 9/2021 | Hu | H04L 5/0094 |
| 2022/0255681 A1* | 8/2022 | Huang | H04L 1/1864 |

* cited by examiner

FIG. 1
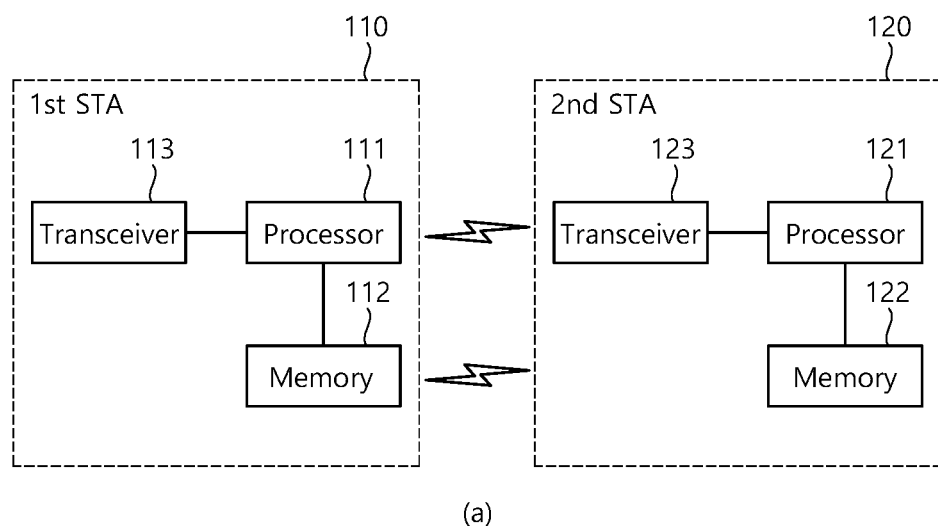
(a)
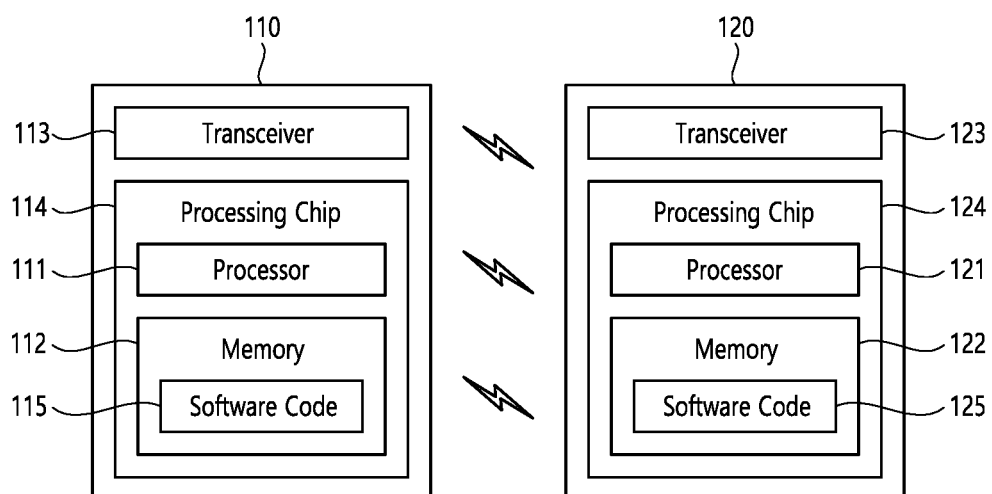
(b)

FIG. 2
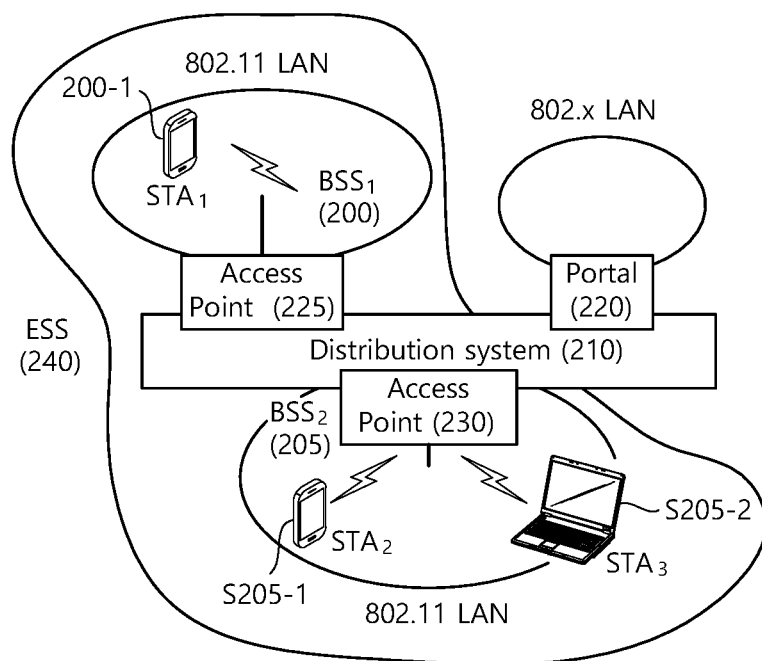
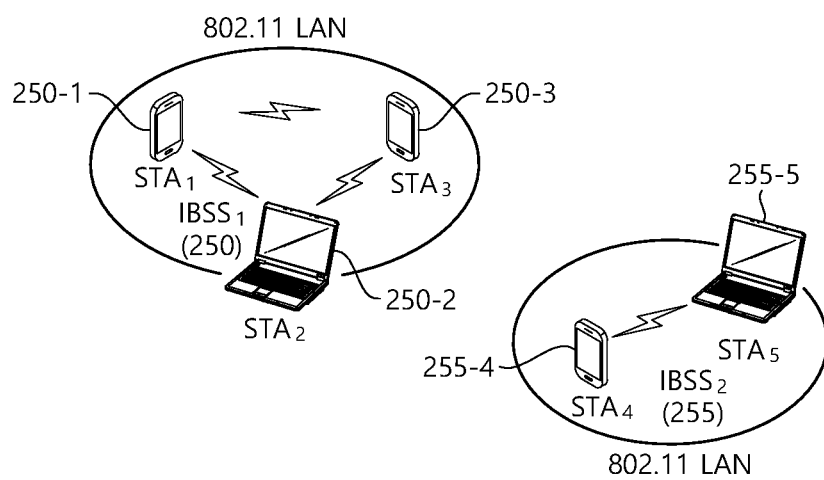

| Version independent field (1910) | Version dependent field (1920) |
|---|---|

FIG. 20

| index | 1 | 2 | 3 | 4 |
|---|---|---|---|---|
| 1 | 242(1) | 242(2) | 484(2) | |
| 2 | 242(1) | 242(2) | 484(2) | |
| 3 | 484(1) | | 242(3) | 242(4) |
| 4 | 484(1) | | 242(3) | 242(4) |

FIG. 21

| index | 1 | 2 | 3 | 4 | 5 | 6 | 7 | 8 |
|---|---|---|---|---|---|---|---|---|
| 1 | 484(1) | 484(1) | 484(2) | 484(2) | | | | |
| 2 | | 484(1) | | | | | | |
| 3 | | | 996(1) | 996(1) | | | 996(2) | 996(2) |
| 4 | | | 996(1) | 996(1) | 484(3) | 484(3) | | 484(4) |

FIG. 22

| RU Allocation subfield | | #1 | #2 | #3 | #4 | #5 | #6 | #7 | #8 | #9 | Number of entries |
|---|---|---|---|---|---|---|---|---|---|---|---|
| MSB (1bit) | 8bit information | | | | | | | | | | |
| B9 | (B8 B7 B6 B5 B4 B3 B2 B1) | LSB(1bit) B0 | | | | | | | | | |
| 0 | 00000000 | 0 | 26 | 26 | 26 | 26 | 26 | 26 | 26 | 26 | 26 | 1 |
| 0 | 00000000 | 1 | | | | | Reserved | | | | | 1 |
| 0 | 00000001 | 0 | 26 | 26 | 26 | 26 | 26 | 26 | 26 | 52 | | 1 |
| 0 | 00000001 | 1 | | | | | Reserved | | | | | 1 |
| 0 | 00000010 | 0 | 26 | 26 | 26 | 26 | 26 | 26 | 52 | 26 | 26 | 1 |
| 0 | 00000010 | 1 | | | | | Reserved | | | | | 1 |
| 0 | 00000011 | 0 | 26 | 26 | 26 | 26 | 26 | 52 | 52 | | | 1 |
| 0 | 00000011 | 1 | | | | | Reserved | | | | | 1 |
| 0 | 00000100 | 0 | 26 | 26 | 52 | | 26 | 26 | 26 | 26 | 26 | 1 |
| 0 | 00000100 | 1 | | | | | Reserved | | | | | 1 |
| 0 | 00000101 | 0 | 26 | 26 | 52 | | 26 | 26 | 26 | 52 | | 1 |
| 0 | 00000101 | 1 | | | | | Reserved | | | | | 1 |
| 0 | 00000110 | 0 | 26 | 26 | 52 | | 26 | 52 | 26 | 26 | 26 | 1 |
| 0 | 00000110 | 1 | | | | | Reserved | | | | | 1 |
| 0 | 00000111 | 0 | 26 | 26 | 52 | | 26 | 26 | 52 | 26 | 26 | 1 |
| 0 | 00000111 | 1 | | | | | Reserved | | | | | 1 |
| 0 | 00001000 | 0 | 52 | | 26 | 26 | 26 | 26 | 26 | 26 | 26 | 1 |

FIG. 23

| | | | | | | | | | |
|---|---|---|---|---|---|---|---|---|---|
| 0 | 00001000 | | Reserved | | | | | | 1 |
| 0 | 00001001 | 0 | 52 | 26 | 26 | 26 | 52 | | 1 |
| 0 | 00001001 | 1 | Reserved | | | | | | 1 |
| 0 | 00001010 | 0 | 52 | 26 | 26 | 26 | 52 | 26 | 1 |
| 0 | 00001010 | 1 | Reserved | | | | | | 1 |
| 0 | 00001011 | 0 | 52 | 26 | 26 | 52 | 26 | | 1 |
| 0 | 00001011 | 1 | Reserved | | | | | | 1 |
| 0 | 00001100 | 0 | | 52 | 26 | 52 | 26 | 26 | 1 |
| 0 | 00001100 | 1 | Reserved | | | | | | 1 |
| 0 | 00001101 | 0 | | 52 | 26 | 26 | 52 | | 1 |
| 0 | 00001101 | 1 | Reserved | | | | | | 1 |
| 0 | 00001110 | 0 | | 52 | 26 | 26 | 52 | 26 | 1 |
| 0 | 00001110 | 1 | Reserved | | | | | | 1 |
| 0 | 00001111 | 0 | | 52 | 26 | 26 | 52 | 26 | 1 |
| 0 | 00001111 | 1 | Reserved | | | | | | 1 |
| 0 | 00010y2y1y0 | w1 | | 52 | 52 | - | 106 | 52 | 16 |
| 0 | 00011y2y1y0 | w1 | 106 | | - | 52 | | | 16 |
| 0 | 00100y2y1y0 | w1 | 26 | 26 | 26 | 26 | 106 | | 16 |
| 0 | 00101y2y1y0 | w1 | 26 | 26 | 52 | 26 | 106 | | 16 |
| 0 | 00110y2y1y0 | w1 | 52 | 52 | 26 | 26 | 106 | | 16 |
| 0 | 00111y2y1y0 | w1 | 52 | 52 | 26 | 26 | 106 | | 16 |

FIG. 24

| 0 | 01000y2y1y0 | w1 | 106 | 26 | 26 | 26 | 26 | 16 |
|---|---|---|---|---|---|---|---|---|
| 0 | 01001y2y1y0 | w1 | 106 | 26 | 26 | 26 | 52 | 16 |
| 0 | 01010y2y1y0 | w1 | 106 | 26 | 26 | 52 | 26 | 16 |
| 0 | 01011y2y1y0 | w1 | 106 | 26 | 52 | 52 | 26 | 16 |
| 0 | 0110y1y0z1z0 | 0 | 106 | - | 106 | 16 | | |
| 0 | 0110y1y0z1z0 | 1 | Reserved | | | | | 1 |
| 0 | 01110000 | 0 | 52 | 52 | 52 | 52 | 1 | |
| 0 | 01110000 | 1 | Reserved | | | | | 1 |
| 0 | 01110001 | 0 | 242-tone RU empty (with zero users) | | | | | 1 |
| 0 | 01110001 | 1 | Reserved | | | | | 1 |
| 0 | 01110010 | 0 | 484-tone RU; contributes zero User fields to the User Specific field in the same HE-SIG-B content channel as this RU Allocation subfield | | | | | 1 |
| 0 | 01110010 | 1 | Reserved | | | | | 1 |
| 0 | 01110011 | 0 | 996-tone RU; contributes zero User fields to the User Specific field in the same HE-SIG-B content channel as this RU Allocation subfield | | | | | 1 |
| 0 | 01110011 | 1 | Reserved | | | | | 1 |
| 0 | 01110100 | 0 | 2x996-tone RU; contributes zero User fields to the User Specific field in the same HE-SIG-B content channel as this RU Allocation subfield | | | | | 1 |
| 0 | 01110100 | 1 | Reserved | | | | | 1 |
| 0 | 01110101 | w1 | Reserved | | | | | 2 |
| 0 | 0111011x0 | w1 | Reserved | | | | | 4 |
| 0 | 01111y2y1y0 | w1 | Reserved | | | | | 16 |

FIG. 25

| 0 | 10y2y1y0z2z1z0 | 0 | 106 | 26 | 106 | 64 |
|---|---|---|---|---|---|---|
| 0 | 11000y2y1y0 | w1 | | 242 | | 16 |
| 0 | 11001y2y1y0 | w1 | | 484 | | 16 |
| 0 | 11010y2y1y0 | w1 | | 996 | | 16 |
| 0 | 11011y2y1y0 | w1 | | 2x996 | | 16 |
| 0 | 111x4x3x2x1x0 | w1 | | Reserved | | 64 |

FIG. 26

| MSB (1bit) | 8bit information | LSB(1bit) | #1 | #2 | #3 | #4 | #5 | #6 | #7 | #8 | #9 | Number of entries |
|---|---|---|---|---|---|---|---|---|---|---|---|---|
| B9 | (B8 B7 B6 B5 B4 B3 B2 B1) | B0 | | | | | | | | | | |
| 0 | 00000000 | 0 | 26 | 26 | 26 | 26 | 26 | 26 | 26 | 26 | 26 | 1 |
| 0 | 00000000 | 1 | | | | | Reserved | | | | | 1 |
| 0 | 00000001 | 0 | 26 | 26 | 26 | 26 | 26 | 26 | 26 | 52 | 26 | 1 |
| 0 | 00000001 | 1 | | | | | Reserved | | | | | 1 |
| 0 | 00000010 | 0 | 26 | 26 | 26 | 26 | 26 | 26 | 52 | 26 | 26 | 1 |
| 0 | 00000010 | 1 | | | | | Reserved | | | | | 1 |
| 0 | 00000011 | 0 | 26 | 26 | 26 | 26 | 26 | 26 | 52 | 26 | 52 | 1 |
| 0 | 00000011 | 1 | | | | | Reserved | | | | | 1 |
| 0 | 00000100 | 0 | 26 | 26 | 26 | 52 | 26 | 26 | 26 | 26 | 26 | 1 |
| 0 | 00000100 | 1 | | | | | Reserved | | | | | 1 |
| 0 | 00000101 | 0 | 26 | 26 | 26 | 52 | 26 | 26 | 26 | 52 | 26 | 1 |
| 0 | 00000101 | 1 | | | | | Reserved | | | | | 1 |
| 0 | 00000110 | 0 | 26 | 26 | 26 | 52 | 26 | 52 | 52 | 26 | 26 | 1 |
| 0 | 00000110 | 1 | | | | | Reserved | | | | | 1 |
| 0 | 00000111 | 0 | 26 | 26 | 26 | 52 | 26 | 52 | 52 | 26 | 26 | 1 |
| 0 | 00000111 | 1 | | | | | Reserved | | | | | 1 |
| 0 | 00001000 | 0 | | 52 | 26 | 26 | 26 | 26 | 26 | 26 | 26 | 1 |
| 0 | 00001000 | 1 | | | | | Reserved | | | | | 1 |

FIG. 27

| | | | | | | | | | |
|---|---|---|---|---|---|---|---|---|---|
| 0 | 00001001 | 0 | 52 | 26 | 26 | 26 | 26 | 52 | 1 |
| 0 | 00001001 | 1 | Reserved | | | | | | 1 |
| 0 | 00001010 | 0 | 52 | 26 | 26 | 52 | 26 | 26 | 1 |
| 0 | 00001010 | 1 | Reserved | | | | | | 1 |
| 0 | 00001011 | 0 | 52 | 26 | 26 | 26 | 52 | 26 | 1 |
| 0 | 00001011 | 1 | Reserved | | | | | | 1 |
| 0 | 00001100 | 0 | 52 | 52 | 26 | 26 | 26 | 26 | 1 |
| 0 | 00001100 | 1 | Reserved | | | | | | 1 |
| 0 | 00001101 | 0 | 52 | 26 | 52 | 26 | 26 | 26 | 1 |
| 0 | 00001101 | 1 | Reserved | | | | | | 1 |
| 0 | 00001110 | 0 | 52 | 26 | 26 | 52 | 26 | 52 | 1 |
| 0 | 00001110 | 1 | Reserved | | | | | | 1 |
| 0 | 00001111 | 0 | 52 | 26 | 26 | 26 | 52 | 52 | 1 |
| 0 | 00001111 | 1 | Reserved | | | | | | 1 |
| 0 | 00010y2y1y0 | w1 | 52 | 52 | - | 52 | 26 | | 16 |
| 0 | 00011y2y1y0 | w1 | 106 | | 52 | - | 52 | 26 | 16 |
| 0 | 00100y2y1y0 | w1 | 26 | 26 | 26 | 26 | 106 | 52 | 16 |
| 0 | 00101y2y1y0 | w1 | 26 | 26 | 26 | 26 | 106 | 52 | 16 |
| 0 | 00110y2y1y0 | w1 | 52 | 26 | 52 | 26 | 106 | | 16 |
| 0 | 00111y2y1y0 | w1 | 52 | 52 | 26 | 26 | 106 | | 16 |
| 0 | 01000y2y1y0 | w1 | 106 | | 52 | 26 | 52 | 26 | 16 |

FIG. 28

| B0 | B1–B7 | B8 | #1 | #2 | #3 | #4 | #5 | #users |
|---|---|---|---|---|---|---|---|---|
| 0 | 01001y2y1y0 | w1 | 106 | 26 | 26 | 26 | 52 | 16 |
| 0 | 01010y2y1y0 | w1 | 106 | 26 | 26 | 52 | 52 | 16 |
| 0 | 01011y2y1y0 | w1 | 106 | 26 | 26 | 52 | 52 | 16 |
| 0 | 0110y1y0z1z0 | 0 | | | | | | |
| 0 | 0110y1y0z1z0 | w1 | Reserved | | | | | 32 |
| 0 | 01110000 | 0 | 52 | 52 | - | 52 | | 1 |
| 0 | 01110000 | 1 | Reserved | | | | | 1 |
| 0 | 01110001 | 0 | 242-tone RU empty (with zero users) | | | | | 1 |
| 0 | 01110001 | 1 | Reserved | | | | | 1 |
| 0 | 01110010 | 0 | 484-tone RU; contributes zero User fields to the User Specific field in the same HE-SIG-B content channel as this RU Allocation subfield | | | | | 1 |
| 0 | 01110010 | 1 | Reserved | | | | | 1 |
| 0 | 01110011 | 0 | 996-tone RU; contributes zero User fields to the User Specific field in the same HE-SIG-B content channel as this RU Allocation subfield | | | | | 1 |
| 0 | 01110011 | 1 | Reserved | | | | | 1 |
| 0 | 01110100 | 0 | 2x996-tone RU; contributes zero User fields to the User Specific field in the same HE-SIG-B content channel as this RU Allocation subfield | | | | | 1 |
| 0 | 01110100 | 1 | Reserved | | | | | 1 |
| 0 | 01110101 | w1 | Reserved | | | | | 2 |
| 0 | 0111011xx0 | w1 | Reserved | | | | | 4 |
| 0 | 01111y2y1y0 | w1 | 106 | 26 | | | | 16 |
| 0 | 10y2y1y0z2z1z0 | 0 | 106 | | | | | 64 |

FIG. 29

| 0 | 11000y2y1y0 | w1 | 242 | | 16 |
|---|---|---|---|---|---|
| 0 | 11001y2y1y0 | w1 | 484 | | 16 |
| 0 | 11010y2y1y0 | w1 | 996 | | 16 |
| 0 | 11011y2y1y0 | w1 | 2x996 | | 16 |
| 0 | 111x4x3x2x1x0 | w1 | - | 106 | 64 |
| | | | | 106 | |

FIG. 30

| | | | ... | | |
|---|---|---|---|---|---|
| 0 | 10y2y10z2z1z0 | 0 | 26 | 106 | 64 |
| 0 | 110x4x3x2x1x0 | w1 | - | 106 | 64 |
| 0 | 11100y2y1y0 | w1 | 242 | | 16 |
| 0 | 11101y2y1y0 | w1 | 484 | | 16 |
| 0 | 11110y2y1y0 | w1 | 996 | | 16 |
| 0 | 11111y2y1y0 | w1 | Reserved | | 16 |

FIG. 31

| RU Allocation subfield | | #1 | #2 | #3 | #4 | #5 | #6 | #7 | #8 | #9 | Number of entries |
|---|---|---|---|---|---|---|---|---|---|---|---|
| MSB (1bit) | 9bit information | | | | | | | | | | |
| B9 | (B8 B7 B6 B5 B4 B3 B2 B1 B0) | | | | | | | | | | |
| 1 | 000000000 | 26 | | 26+52 | | 26 | 26 | 26 | 26 | 26 | 1 |
| 1 | 000000001 | 26 | | 26+52 | | 26 | 26 | 26 | 52 | | 1 |
| 1 | 000000010 | 26 | | 26+52 | | 26 | 52 | | 26 | 26 | 1 |
| 1 | 000000011 | 26 | | 26+52 | | 26 | 52 | | 52 | | 1 |
| 1 | 000000100 | 26 | 26 | 26 | 26 | 26 | | 52+26 | | 26 | 1 |
| 1 | 000000101 | 26 | 26 | | 52 | 26 | | 52+26 | | 26 | 1 |
| 1 | 000000110 | | 52 | 26 | 26 | 26 | | 52+26 | | 26 | 1 |
| 1 | 000000111 | | 52 | | 52 | 26 | | 52+26 | | 26 | 1 |
| 1 | 000001000 | 26 | | 26+52 | | 26 | | | | | 1 |
| 1 | 000001001~1111 | | | | | reserved | | | | | 7 |
| 1 | 00001x3x2x1x0 | 26 | | 26+52 | | 26 | 26 | | 106 | | 16 |
| 1 | 00010x3x2x1x0 | | 106 | | | 26 | 26 | 52+26 | | 26 | 16 |
| 1 | 00011x3x2x1x0 | 26 | 26 | 26 | 26 | | | 26+106 | | | 16 |
| 1 | 00100x3x2x1x0 | 26 | 26 | | 52 | | | 26+106 | | | 16 |
| 1 | 00101x3x2x1x0 | | 52 | 26 | 26 | | | 26+106 | | | 16 |
| 1 | 00110x3x2x1x0 | | 52 | | 52 | | | 26+106 | | | 16 |
| 1 | 00111x3x2x1x0 | | | 106+26 | | | 26 | 26 | 26 | 26 | 16 |

FIG. 32

| 1 | 01000x3x2x1x0 | 106+26 | 26 | 52 | 26 | 16 |
| --- | --- | --- | --- | --- | --- | --- |
| 1 | 01001x3x2x1x0 | 106+26 | | 52 | 26 | 16 |
| 1 | 01010x3x2x1x0 | 106+26 | 52 | | 26 | 16 |
| 1 | 01011x3x2x1x0 | 106+26 | 52+26 | | 26 | 16 |
| 1 | 01100x3x2x1x0 | 26+52 | 26+106 | | | 16 |
| 1 | 01101x3x2x1x0 | 26 | reserved | | | 16 |
| 1 | 01110x3x2x1x0 | reserved | | | | 16 |
| 1 | 01111x3x2x1x0 | reserved | | | | 16 |
| 1 | 100y5y4y3y2y1y0 | 106 | | | | 64 |
| 1 | 101y5y4y3y2y1y0 | 106+26 | 26+106 | | | 64 |
| 1 | 11000x3x2x1x0 | 242(1)+484(2), second 242 is not allocated in 80MHz | | | | 16 |
| 1 | 11001x3x2x1x0 | 242(2)+484(2) , first 242 is not allocated in 80MHz | | | | 16 |
| 1 | 11010x3x2x1x0 | 484(1)+242(4), third 242 is not allocated in 80MHz | | | | 16 |
| 1 | 11011x3x2x1x0 | 484(1)+242(3), forth 242 is not allocated in 80MHz | | | | 16 |
| 1 | 11100x3x2x1x0 | 484(1)+996(2), second 484 is not allocated in 160MHz | | | | 16 |
| 1 | 11101x3x2x1x0 | 484(2)+996(2) , first 484 is not allocated in 160MHz | | | | 16 |
| 1 | 11110x3x2x1x0 | 996(1)+484(4), third 484 is not allocated in 160MHz | | | | 16 |
| 1 | 11111x3x2x1x0 | 996(1)+484(3), forth 484 is not allocated in 160MHz | | | | 16 |

FIG. 33

| 80 MHz RU size | 80 MHz RU size | 80 MHz RU size | Aggregate BW | Notes |
|---|---|---|---|---|
| 484 | 996 | 996 | 200 MHz | 6 options |
| - | 996 | 996 | 160 MHz | 3 options |

FIG. 34

| 80 MHz RU size | 80 MHz RU size | 80 MHz RU size | 80 MHz RU size | Aggregate BW | Notes |
|---|---|---|---|---|---|
| 484 | 996 | 996 | 996 | 280 MHz | 8 options |
| - | 996 | 996 | 996 | 240 MHz | 4 options |

FIG. 35

| MSB 1bit | 7bit information | #1 | #2 | #3 | #4 | #5 | #6 | #7 | #8 | #9 | Number of entries |
|---|---|---|---|---|---|---|---|---|---|---|---|
| B7 | (B6 B5 B4 B3 B2 B1 B0) | | | | | | | | | | |
| 0 | 0000000 | 26 | 26 | 26 | 26 | 26 | 26 | 26 | 26 | 26 | 1 |
| 0 | 0000001 | 26 | 26 | 26 | 26 | 26 | 26 | 26 | 52 | 26 | 1 |
| 0 | 0000010 | 26 | 26 | 26 | 26 | 26 | 26 | 52 | 26 | 26 | 1 |
| 0 | 0000011 | 26 | 26 | 26 | 26 | 26 | 26 | 52 | 52 | 26 | 1 |
| 0 | 0000100 | 26 | 26 | 26 | 52 | 26 | 26 | 26 | 26 | 26 | 1 |
| 0 | 0000101 | 26 | 26 | 26 | 52 | 26 | 26 | 26 | 52 | 26 | 1 |
| 0 | 0000110 | 26 | 26 | 26 | 52 | 26 | 26 | 52 | 26 | 26 | 1 |
| 0 | 0000111 | 26 | 26 | 26 | 52 | 26 | 26 | 52 | 52 | 26 | 1 |
| 0 | 0001000 | 52 | 26 | 26 | 26 | 26 | 26 | 26 | 26 | 26 | 1 |
| 0 | 0001001 | 52 | 26 | 26 | 26 | 26 | 26 | 26 | 52 | 26 | 1 |
| 0 | 0001010 | 52 | 26 | 26 | 26 | 26 | 26 | 52 | 26 | 26 | 1 |
| 0 | 0001011 | 52 | 26 | 26 | 26 | 26 | 26 | 52 | 52 | 26 | 1 |
| 0 | 0001100 | 52 | 26 | 26 | 52 | 26 | 26 | 26 | 26 | 26 | 1 |
| 0 | 0001101 | 52 | 26 | 26 | 52 | 26 | 26 | 26 | 52 | 26 | 1 |
| 0 | 0001110 | 52 | 26 | 26 | 52 | 26 | 26 | 52 | 26 | 26 | 1 |
| 0 | 0001111 | 52 | 26 | 26 | 52 | - | - | 106 | 26 | 26 | 1 |
| 0 | 0010000 | 52 | 106 | 26 | 26 | 26 | 52 | 52 | 52 | 52 | 1 |
| 0 | 0010001 | 52 | 26 | 26 | 26 | 26 | 26 | 52 | 26 | 52 | 1 |

FIG. 36

| | | | | | | | | | |
|---|---|---|---|---|---|---|---|---|---|
| 0 | 0010010 | 26 | 26 | 26 | 26 | 26 | 106 | | 1 |
| 0 | 0010011 | 26 | 26 | 52 | | 26 | 106 | | 1 |
| 0 | 0010100 | 52 | | 26 | 26 | 26 | 106 | | 1 |
| 0 | 0010101 | 52 | | 52 | | 26 | 106 | | 1 |
| 0 | 0010110 | 106 | | | 26 | 26 | 26 | 26 | 1 |
| 0 | 0010111 | 106 | | | 26 | 26 | 26 | 26 | 1 |
| 0 | 0011000 | 106 | | | 26 | 26 | 26 | 26 | 1 |
| 0 | 0011001 | 106 | | | 26 | 26 | 26 | 26 | 1 |
| 0 | 0011010 | 106 | | | - | - | 106 | | 1 |
| 0 | 0011011 | 52 | | 52 | | 26 | 52 | 52 | 1 |
| 0 | 0011100 | 106 | | | 26 | 26 | 106 | | 1 |
| 0 | 0011101 | 242-tone RU empty (with zero users) | | | | | | | 1 |
| 0 | 0011110 | 484-tone RU; contributes zero User fields to the User Specific field in the same HE-SIG-B content channel as this RU Allocation subfield | | | | | | | 1 |
| 0 | 0011111 | 996-tone RU; contributes zero User fields to the User Specific field in the same HE-SIG-B content channel as this RU Allocation subfield | | | | | | | 1 |
| 0 | 0100000 | 2x996-tone RU; contributes zero User fields to the User Specific field in the same HE-SIG-B content channel as this RU Allocation subfield | | | | | | | 1 |
| 0 | 0100001 | 3x996-tone RU; contributes zero User fields to the User Specific field in the same HE-SIG-B content channel as this RU Allocation subfield | | | | | | | 1 |
| 0 | 010001x1 | reserved | | | | | | | 2 |
| 0 | 01001x1x2 | reserved | | | | | | | 4 |

FIG. 37

| 0 | 0101y1y2y3 | 242 | 8 |
| 0 | 0110y1y2y3 | 484 | 8 |
| 0 | 0111y1y2y3 | 996 | 8 |
| 0 | 1000y1y2y3 | 2x996 | 8 |
| 0 | 1001y1y2y3 | 3x996 | 8 |
| 0 | 101x1x2x3x4 | reserved | 16 |
| 0 | 11x1x2x3x4x5 | reserved | 32 |

FIG. 38

| | | | | | | | | | | | | | |
|---|---|---|---|---|---|---|---|---|---|---|---|---|---|
| 1 | 0000000 | 26 | 26+52 | | 26 | | 26 | 26 | 26 | 26 | | | 1 |
| 1 | 0000001 | 26 | 26+52 | | 26 | | 26 | 26 | 26 | 26 | 52 | | 1 |
| 1 | 0000010 | 26 | 26+52 | | 26 | 52 | 26 | | 26 | 26 | 26 | | 1 |
| 1 | 0000011 | 26 | 26+52 | | 26 | 52 | 26 | | | 52+26 | 26 | | 1 |
| 1 | 0000100 | 26 | 26 | 26 | 26 | | 52 | | | 52+26 | 26 | | 1 |
| 1 | 0000101 | 26 | 52 | 26 | 26 | | 52 | | | 52+26 | 26 | | 1 |
| 1 | 0000110 | | 52 | | 26 | | 26 | | | 52+26 | 26 | | 1 |
| 1 | 0000111 | 52 | | | 26 | | 26 | | | 52+26 | 26 | | 1 |
| 1 | 0001000 | 26 | 26+52 | | 26 | | 26 | | | | 26 | | 1 |
| 1 | 0001001 | 26 | 26+52 | | 26 | | | | 106 | | | | 1 |
| 1 | 0001010 | | 106 | | 26 | | | | | 52+26 | 26 | | 1 |
| 1 | 0001011 | 26 | 26 | 26 | | | | 26 | | 26+106 | 26 | | 1 |
| 1 | 0001100 | 26 | 52 | 26 | | | | 26 | | 26+106 | | | 1 |
| 1 | 0001101 | 52 | 26 | | | | | 52 | | 26+106 | | | 1 |
| 1 | 0001110 | 52 | 26 | 26 | | | | 52 | | 26+106 | 26 | 26 | 1 |
| 1 | 0001111 | | 106+26 | | | | | 26 | | 26 | 26 | 52 | 1 |
| 1 | 0010000 | | 106+26 | | | | | 26 | | 26 | 26 | 52 | 1 |
| 1 | 0010001 | | 106+26 | | | | | 52 | | | 52 | | 1 |
| 1 | 0010010 | | 106+26 | | | | | 52 | | | 52 | | 1 |
| 1 | 0010011 | | 106+26 | | | | | | | 52+26 | | 26 | 1 |
| 1 | 0010100 | 26 | 26+52 | | | | | | | 26+106 | | 26 | 1 |

FIG. 39

| | | | |
|---|---|---|---|
| 1 | 0010101 | Reserved | 1 |
| 1 | 001011x1 | Reserved | 2 |
| 1 | 0011y1y2y3 | 242(1)+484(2), second 242 is not allocated in 80MHz | 8 |
| 1 | 0100y1y2y3 | 242(2)+484(2), first 242 is not allocated in 80MHz | 8 |
| 1 | 0101y1y2y3 | 484(1)+242(4), third 242 is not allocated in 80MHz | 8 |
| 1 | 0110y1y2y3 | 484(1)+242(3), forth 242 is not allocated in 80MHz | 8 |
| 1 | 0111y1y2y3 | 484(1)+996(2), second 484 is not allocated in 160MHz | 8 |
| 1 | 1000y1y2y3 | 484(2)+996(2), first 484 is not allocated in 160MHz | 8 |
| 1 | 1001y1y2y3 | 996(1)+484(4), third 484 is not allocated in 160MHz | 8 |
| 1 | 1010y1y2y3 | 996(1)+484(3), forth 484 is not allocated in 160MHz | 8 |
| 1 | 1011y1y2y3 | 996(1)+996(3)+996(4), second 996 is not allocated in 320MHz | 8 |
| 1 | 1100y1y2y3 | 996(1)+996(2)+996(4), third 996 is not allocated in 320MHz | 8 |
| 1 | 1101y1y2y3 | 996(1)+996(2)+996(3), fourth 996 is not allocated in 320MHz | 8 |
| 1 | 1110y1y2y3 | 996(2)+996(3)+996(4), first 996 is not allocated in 320MHz | 8 |
| 1 | 1111y1y2y3 | Reserved | 8 |

TECHNIQUES FOR ALLOCATING A RESOURCE UNIT IN WIRELESS LOCAL AREA NETWORK SYSTEM

CROSS-REFERENCE TO RELATED APPLICATIONS

Pursuant to 35 U.S.C. § 119, this application claims the benefit of U.S. Provisional Application No. 63/014,731, filed on Apr. 24, 2020, and claims the benefit of earlier filing date and right of priority to Korean Patent Application Nos. 10-2020-0041684, filed on Apr. 6, 2020, and 10-2020-0060459, filed on May 20, 2020, the contents of which are all hereby incorporated by reference herein in their entirety.

BACKGROUND OF THE DISCLOSURE

Field of the Disclosure

The present specification relates to a method of allocating a resource unit (RU) in a wireless LAN system, and more particularly, to a method of allocating a multiple RU in a wireless LAN system and an apparatus thereof.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In the EHT standard, a wide bandwidth (e.g., 160/240/320 MHz) may be used for high throughput. In addition, preamble puncturing and multiple RU transmission may be used to efficiently use the bandwidth.

Therefore, for multiple RU transmission, a new RU allocation (field) needs to be configured. Accordingly, the following specification proposes a technical feature regarding the configuration of RU allocation (field) information in consideration of multiple RU transmission.

SUMMARY

Accordingly to various embodiments of this document, a receiving STA may receive a Physical layer Protocol Data Unit (PPDU) including a first signal field and a second signal field, wherein the first signal field includes 3 bit information related to a version of the PPDU, wherein the second signal field includes 10 bit information related to a configuration of a plurality of resource units (RUs), wherein first bit information of the 10 bit information includes information for determining the configuration as one of a first configuration and a second configuration. Further, the receiving STA may decode the PPDU based on the first signal field and the second signal field.

According to various embodiments, 10 bit information for transmitting information related to RU allocation may be configured. Among the 10 bit information, the first bit information may be used to determine the configuration of the allocated RU. The above features have an advantageous effect in which the receiving STA is able to check whether the allocated RU is configured as a single RU (SRU) or a multiple RU (MRU) based on the first bit information.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 19 shows an example of U-SIG.

FIG. 20 shows an example of RU aggregation.

FIG. 21 shows an example of RU aggregation.

FIGS. 22 to 25 show examples of RU allocation information in the RU allocation field.

FIGS. 26 to 29 show examples of RU allocation information in the RU allocation field.

FIG. 30 shows an example of RU allocation information in the RU allocation field.

FIGS. 31 and 32 show examples of RU allocation information in the RU allocation field.

FIG. 33 shows an example of an aggregation of large-size RUs or preamble puncturing.

FIG. 34 shows an example of an aggregation of large-size of RUs or preamble puncturing.

FIGS. 35 to 39 show examples of RU allocation information in the RU allocation field.

DESCRIPTION OF EXEMPLARY EMBODIMENTS

Figure 3:
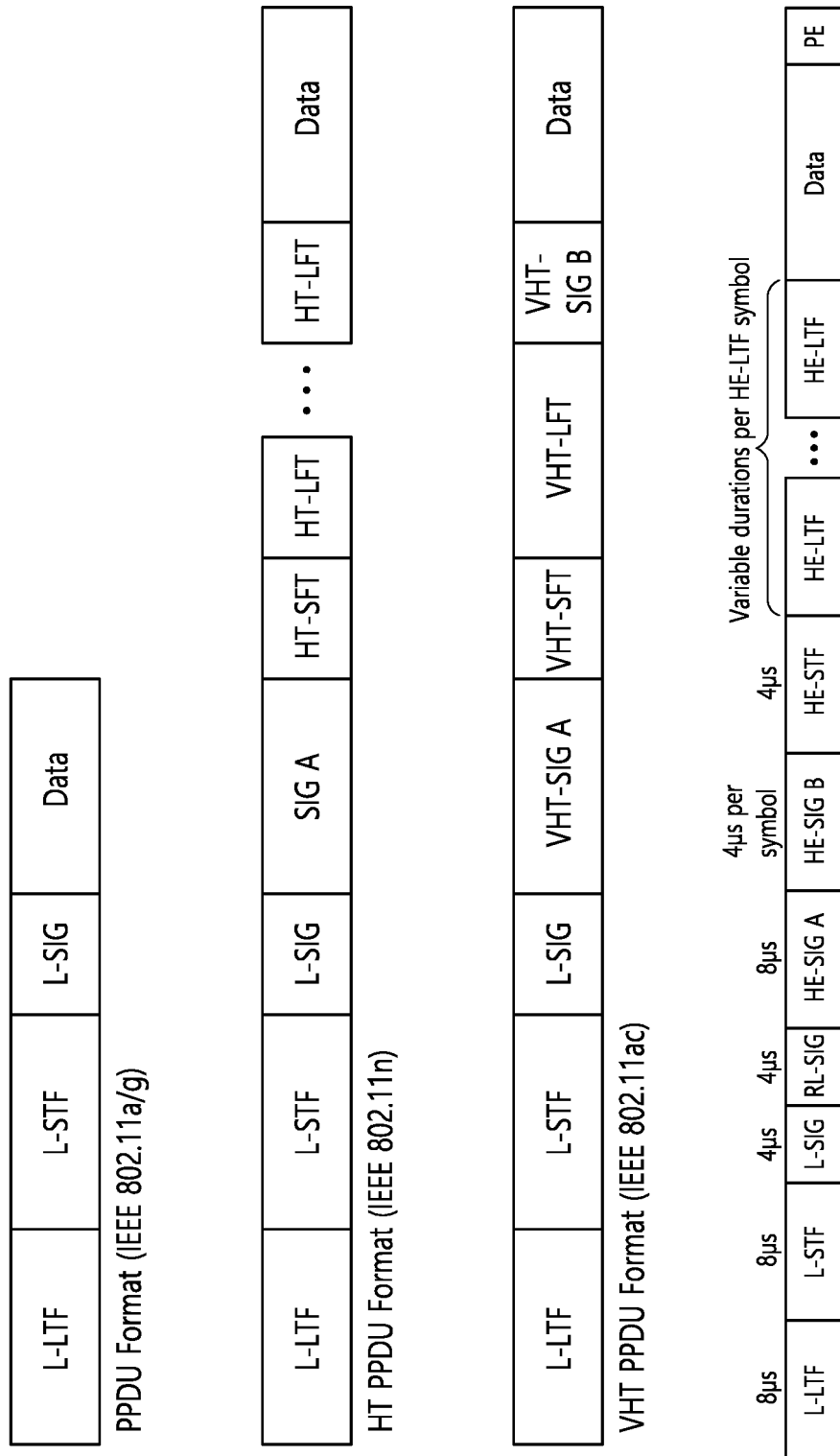
FIG. 3 illustrates an example of a PPDU used in an IEEE standard.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113.

The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBS S, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates an example of a PPDU used in an IEEE standard.

As illustrated in FIG. 3, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
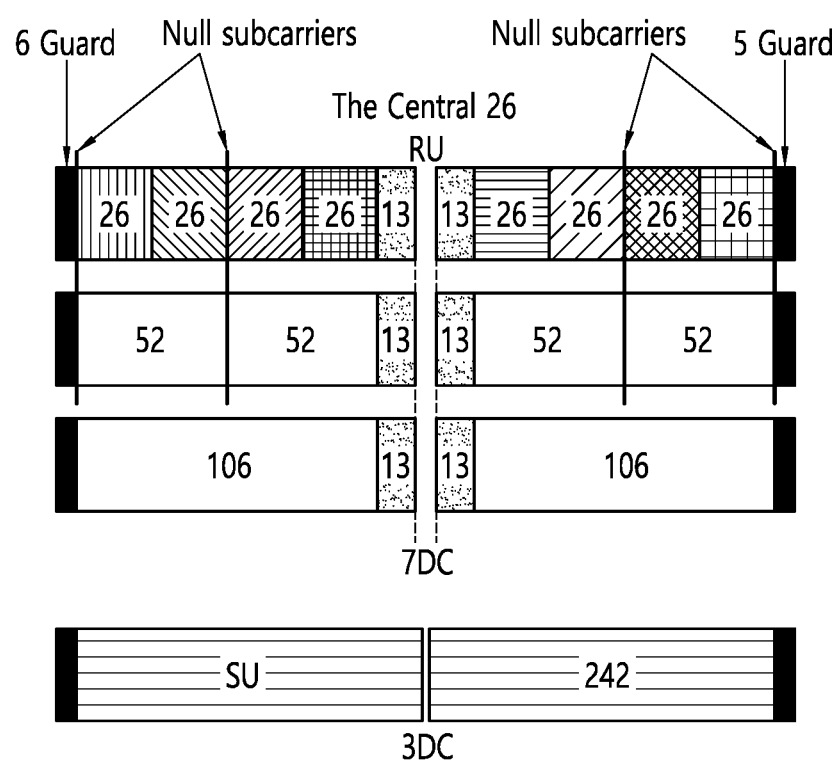
FIG. 4 illustrates a layout of resource units (RUs) used in a band of 20 MHz.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
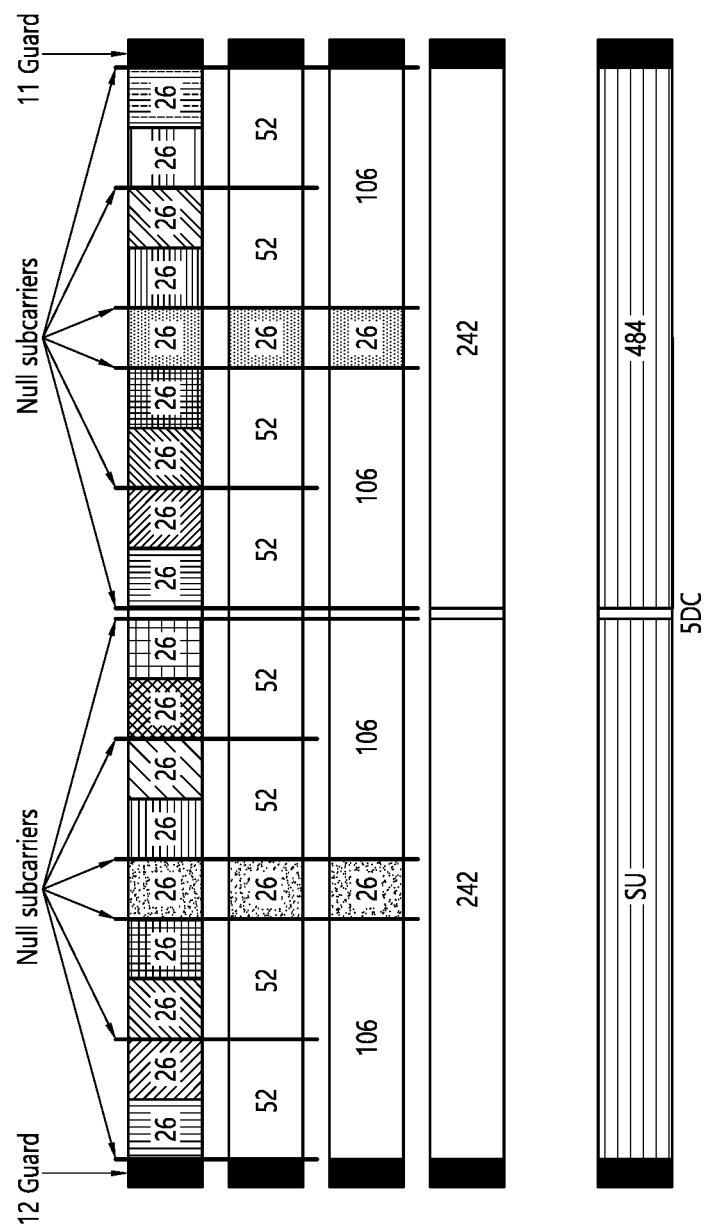
FIG. 5 illustrates a layout of RUs used in a band of 40 MHz.

FIG. 5 illustrates a layout of RUs used in a band of 40 MHz.

Similarly to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similarly to FIG. 5.

Figure 6:
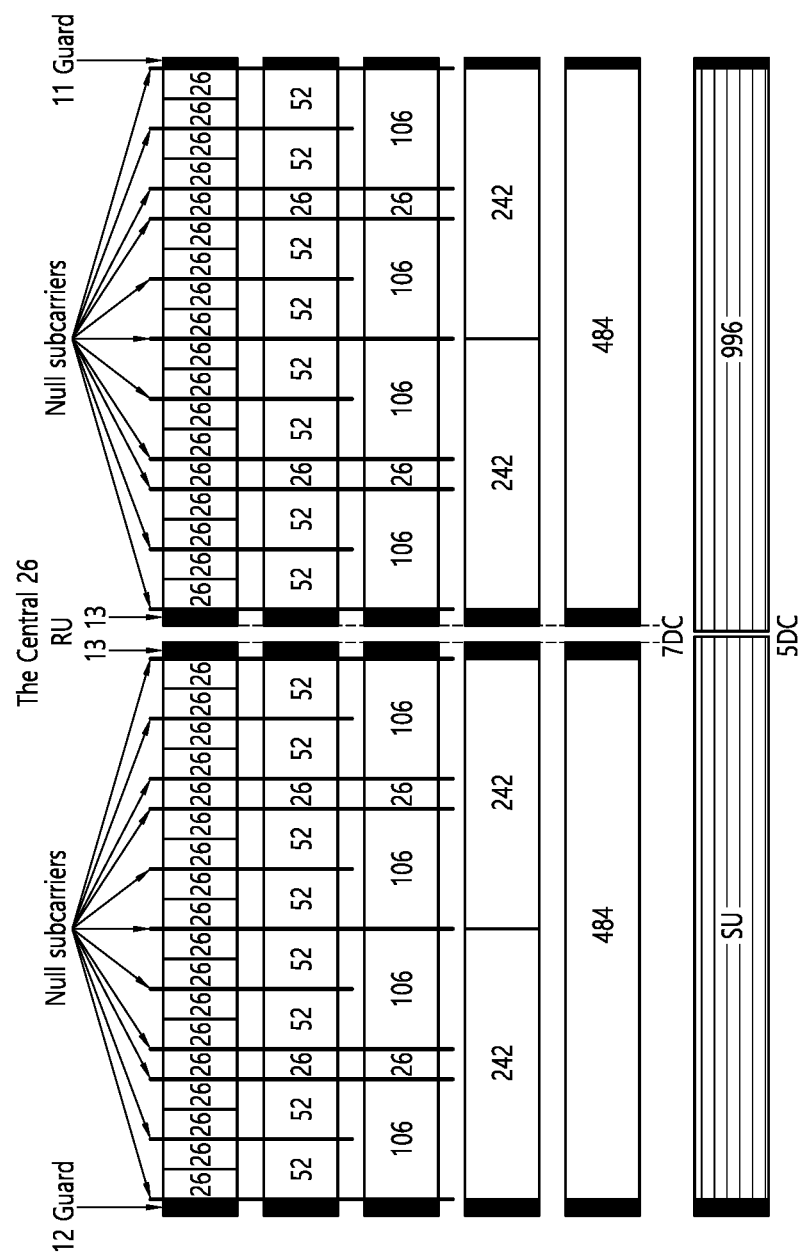
FIG. 6 illustrates a layout of RUs used in a band of 80 MHz.

FIG. 6 illustrates a layout of RUs used in a band of 80 MHz.

Similarly to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 7:
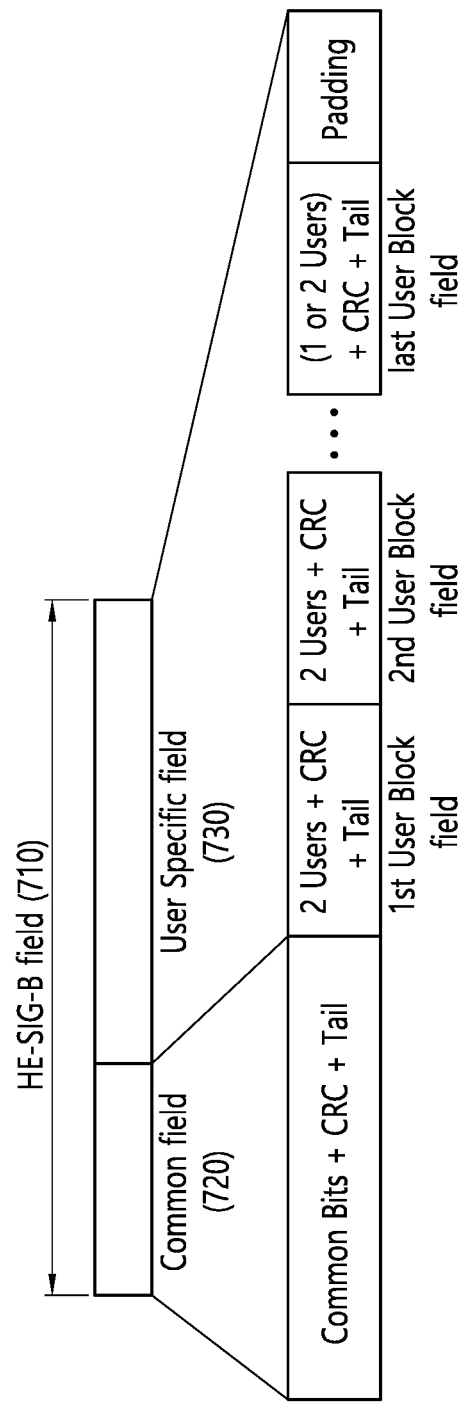
FIG. 7 illustrates a structure of an HE-SIG-B field.

FIG. 7 illustrates a structure of an HE-SIG-B field.

As illustrated, an HE-SIG-B field 710 includes a common field 720 and a user-specific field 730. The common field 720 may include information commonly applied to all users (i.e., user STAs) which receive SIG-B. The user-specific field 730 may be called a user-specific control field. When the SIG-B is transferred to a plurality of users, the user-specific field 730 may be applied only any one of the plurality of users.

As illustrated, the common field 720 and the user-specific field 730 may be separately encoded.

The common field 720 may include RU allocation information of N*8 bits. For example, the RU allocation information may include information related to a location of an RU. For example, when a 20 MHz channel is used as shown in FIG. 4, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 4, up to nine 26-RUs may be allocated to the 20 MHz channel. When the RU allocation information of the common field 720 is set to "00000000" as shown in Table 1, the nine 26-RUs may be allocated to a corresponding channel (i.e., 20 MHz). In addition, when the RU allocation information of the common field 720 is set to "00000001" as shown in Table 1, seven 26-RUs and one 52-RU are arranged in a corresponding channel. That is, in the example of FIG. 4, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | | 106 | | 26 | 25 | 26 | 26 | 26 | 8 |
| 01001$y_2y_1y_0$ | | | 106 | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 7, the user-specific field 730 may include a plurality of user fields. As described above, the number of STAs (e.g., user STAs) allocated to a specific channel may be determined based on the RU allocation information of the common field 720. For example, when the RU allocation information of the common field 720 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 8.

Figure 8:
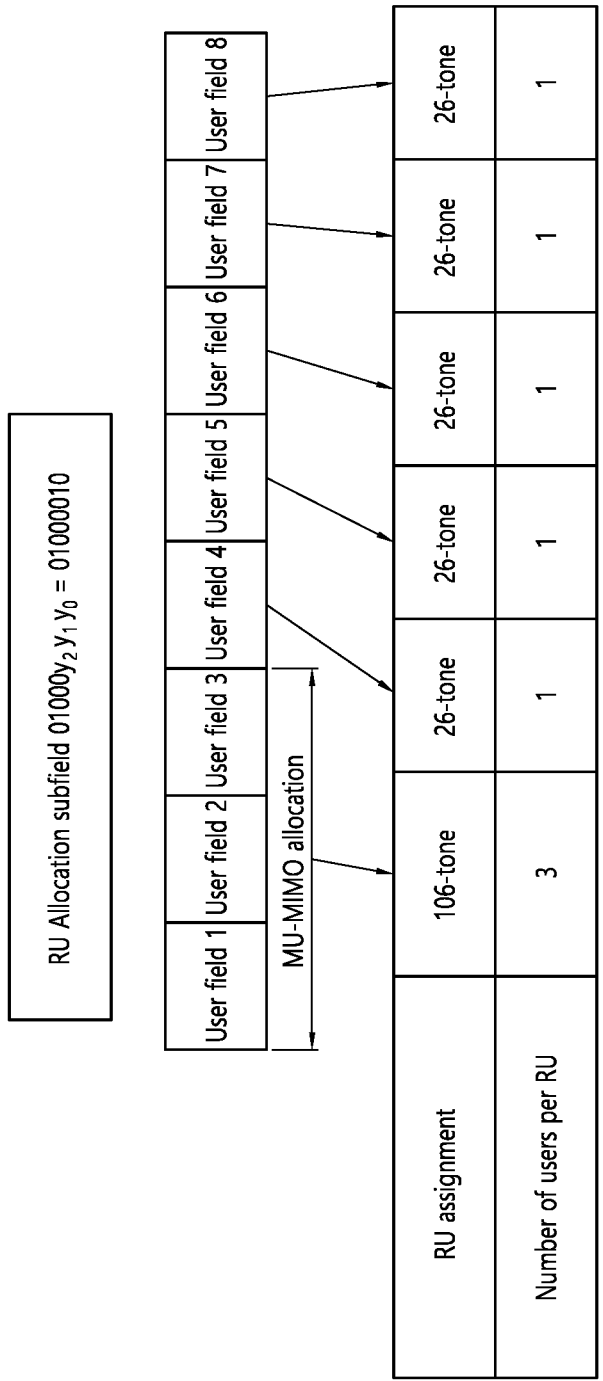
FIG. 8 illustrates an example in which a plurality of user STAs are allocated to the same RU through a MU-MIMO scheme.

FIG. 8, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

FIG. 8 illustrates an example in which a plurality of user STAs are allocated to the same RU through a MU-MIMO scheme.

For example, when RU allocation is set to "01000010" as shown in FIG. 7, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 730 of HE-SIG-B may include eight user fields.

Figure 9:
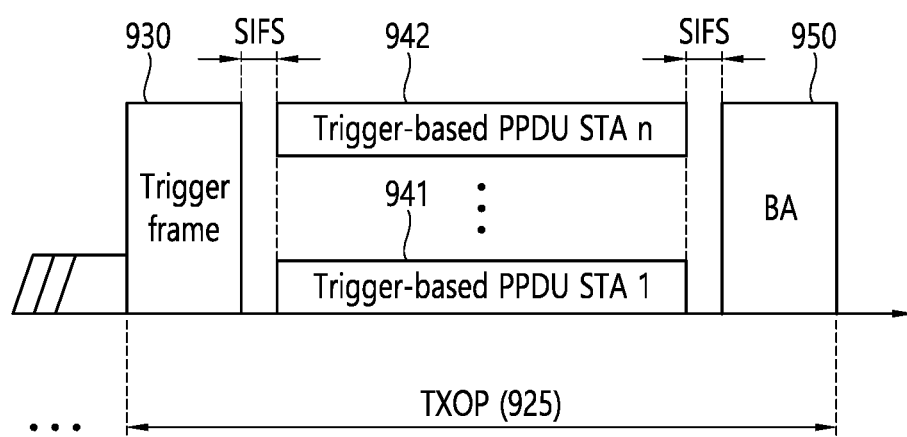
FIG. 9 illustrates an operation based on UL-MU.

The eight user fields may be expressed in the order shown in FIG. 9. In addition, as shown in FIG. 7, two user fields may be implemented with one user block field.

The user fields shown in FIG. 7 and FIG. 8 may be configured based on two formats. That is, a user field related to a MU-MIMO scheme may be configured in a first format, and a user field related to a non-MIMO scheme may be configured in a second format. Referring to the example of As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 8, N_user is set to "3". Therefore, values of N_STS[1], N_STS[2], and N_STS [3] may be determined as shown in Table 3. For example, when a values of the second bit (B11-B14) is "0011", it may be set to N_STS[1]=4, N_STS[2]=1, N_STS[3]=1. That is, in the example of FIG. 8, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

FIG. 9 illustrates an operation based on UL-MU. As illustrated, a transmitting STA (e.g., AP) may perform channel access through contending (e.g., a backoff operation), and may transmit a trigger frame 930. That is, the transmitting STA may transmit a PPDU including the trigger frame 930. Upon receiving the PPDU including the trigger frame, a trigger-based (TB) PPDU is transmitted after a delay corresponding to SIFS.

TB PPDUs 941 and 942 may be transmitted at the same time period, and may be transmitted from a plurality of STAs (e.g., user STAs) having AIDs indicated in the trigger frame 930. An ACK frame 950 for the TB PPDU may be implemented in various forms.

Figure 10:
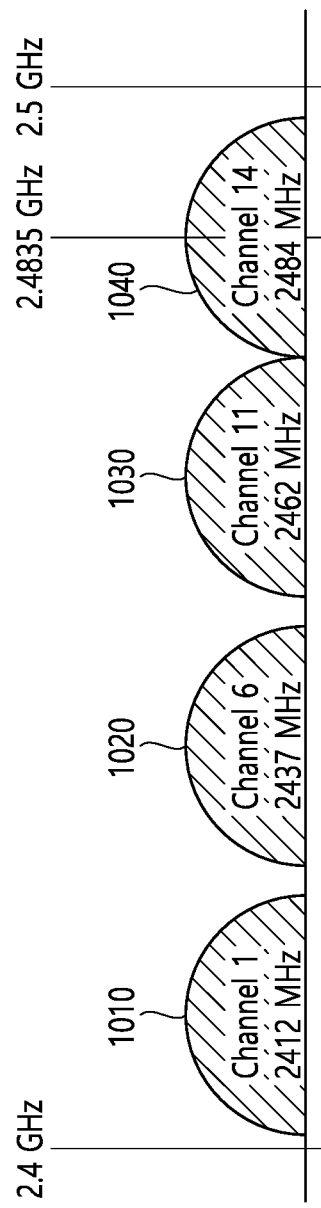
FIG. 10 illustrates an example of a channel used/supported/defined within a 2.4 GHz band.

FIG. 10 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 10 exemplifies 4 channels within a 2.4 GHz band. Each of 1st to 4th frequency domains 1010 to 1040 shown herein may include one channel. For example, the 1st frequency domain 1010 may include a channel 1 (a 20 MHz channel having an index 1). In this case, a center frequency of the channel 1 may be set to 2412 MHz. The 2nd frequency domain 1020 may include a channel 6. In this case, a center frequency of the channel 6 may be set to 2437 MHz. The 3rd frequency domain 1030 may include a channel 11. In this case, a center frequency of the channel 11 may be set to 2462 MHz. The 4th frequency domain 1040 may include a channel 14. In this case, a center frequency of the channel 14 may be set to 2484 MHz.

Figure 11:
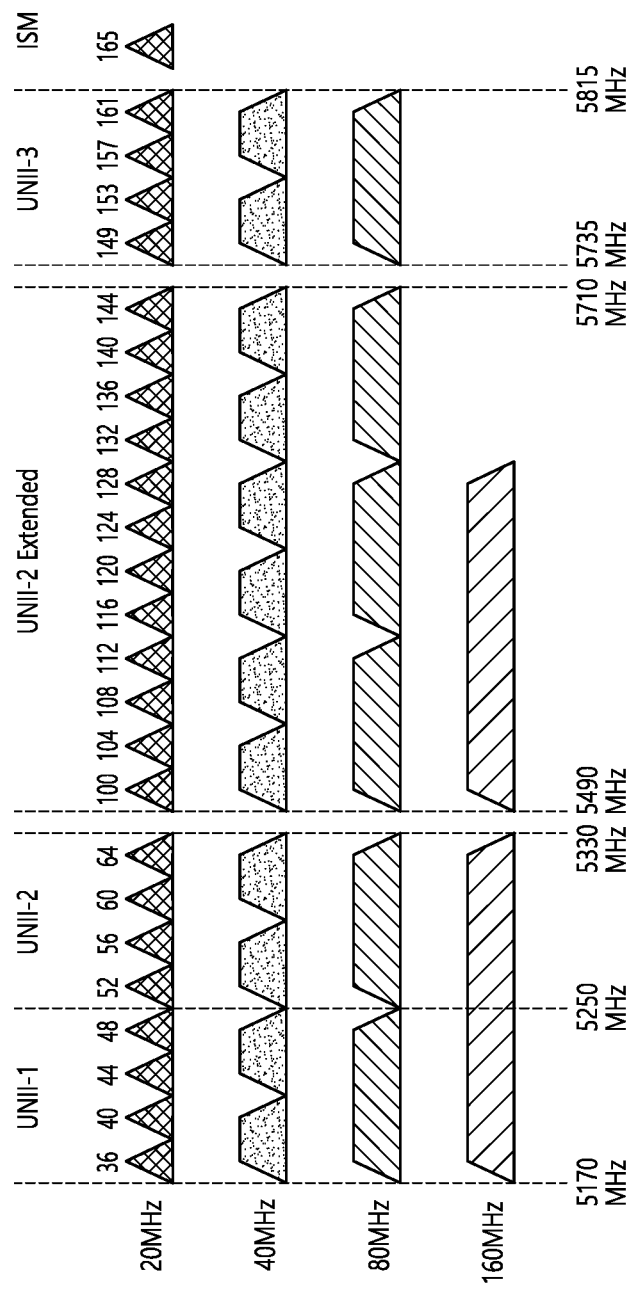
FIG. 11 illustrates an example of a channel used/supported/defined within a 5 GHz band.

FIG. 11 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 11 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 12:
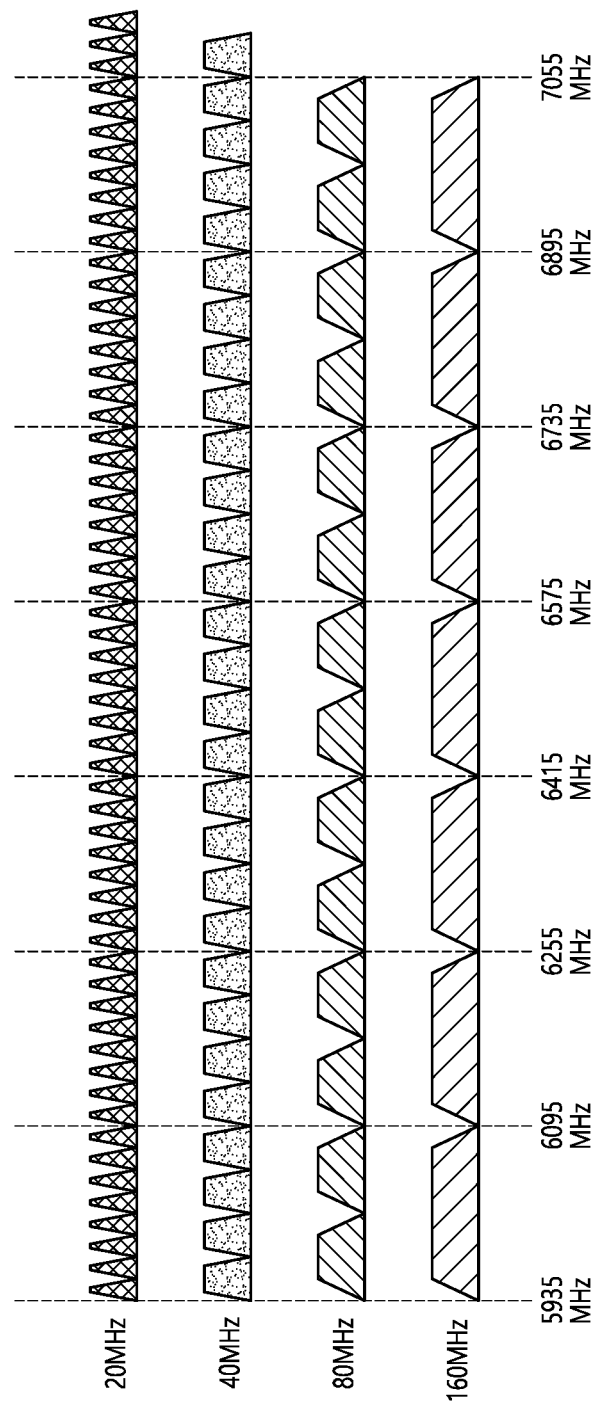
FIG. 12 illustrates an example of a channel used/supported/defined within a 6 GHz band.

FIG. 12 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 12 may be changed.

For example, the 20 MHz channel of FIG. 12 may be defined starting from 5.940 GHz. Specifically, among 20 MHz channels of FIG. 12, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 12 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 12 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 12, a 240 MHz channel or a 320 MHz channel may be additionally added.

Hereinafter, a PPDU transmitted/received in an STA of the present specification will be described.

Figure 13:
FIG. 13 illustrates an example of a PPDU used in the present specification.

FIG. 13 illustrates an example of a PPDU used in the present specification.

The PPDU of FIG. 13 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

Figure 18:
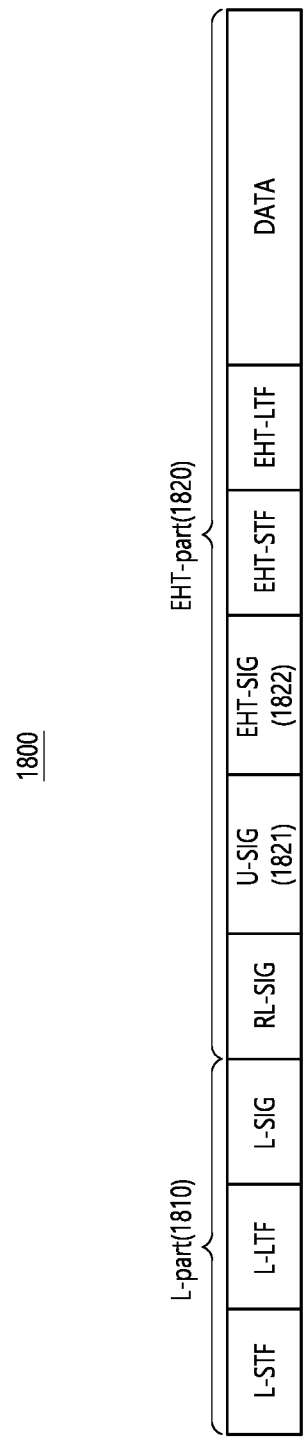
FIG. 18 shows an example of an EHT PPDU.

The PPDU of FIG. 13 may indicate the entirety or part of a PPDU type used in the EHT system. For example, the example of FIG. 13 may be used for both of a single-user (SU) mode and a multi-user (MU) mode. In other words, the PPDU of FIG. 13 may be a PPDU for one receiving STA or a plurality of receiving STAs. When the PPDU of FIG. 18 is used for a trigger-based (TB) mode, the EHT-SIG of FIG. 13 may be omitted. In other words, an STA which has received a trigger frame for uplink-MU (UL-MU) may transmit the PPDU in which the EHT-SIG is omitted in the example of FIG. 13.

In FIG. 13, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 13 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 13, the L-LTF and the L-STF may be the same as those in the conventional fields.

The L-SIG field of FIG. 13 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 13. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, '000000'.

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 13. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 13 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 7 and FIG. 8. For example, the EHT-SIG may include a common field and a user-specific field as in the example of FIG. 7. The common field of the EHT-SIG may be omitted, and the number of user-specific fields may be determined based on the number of users.

As in the example of FIG. 7, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 7, the common field of the EHT-SIG may include a CRC bit and a tail bit. A length of the CRC bit may be determined as 4 bits. A length of the tail bit may be determined as 6 bits, and may be set to '000000'.

As in the example of FIG. 7, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | 26 | 26 | 26 | 26 | 26 | 1 |
| 5 | 26 | 26 | | 52 | 26 | 26 | 26 | 52 | | 1 |
| 6 | 26 | 26 | | 52 | 26 | 52 | | 26 | 26 | 1 |
| 7 | 26 | 26 | | 52 | 26 | 52 | | 52 | | 1 |
| 8 | | 52 | 26 | 26 | 26 | 26 | 26 | 26 | 26 | 1 |
| 9 | | 52 | 26 | 26 | 26 | 26 | 26 | 52 | | 1 |
| 10 | | 52 | 26 | 26 | 26 | 52 | | 26 | 26 | 1 |
| 11 | | 52 | 26 | 26 | 26 | 52 | | 52 | | 1 |
| 12 | | 52 | | 52 | 26 | 26 | 26 | 26 | 26 | 1 |
| 13 | | 52 | | 52 | 26 | 26 | 26 | 52 | | 1 |
| 14 | | 52 | | 52 | 26 | 52 | | 26 | 26 | 1 |
| 15 | | 52 | | 52 | 26 | 52 | | 52 | | 1 |
| 16 | 26 | 26 | 26 | 26 | 26 | | 106 | | | 1 |
| 17 | 26 | 26 | | 52 | 26 | | 106 | | | 1 |
| 18 | | 52 | 26 | 26 | 26 | | 106 | | | 1 |
| 19 | | 52 | | 52 | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | | 106 | | 26 | 26 | 26 | 26 | 26 | 1 |
| 21 | | | 106 | | 26 | 26 | 26 | 52 | | 1 |
| 22 | | | 106 | | 26 | 52 | | 26 | 26 | 1 |
| 23 | | | 106 | | 26 | 52 | | 52 | | 1 |
| 24 | | 52 | | 52 | — | | 52 | | 52 | 1 |
| 25 | | | 242-tone RU empty (with zero users) | | | | | | | 1 |
| 26 | | | 106 | | | 26 | | 106 | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | | 52 | 26 | | 52 + 26 | | 26 | 1 |
| 64 | 26 | | 26 + 52 | | 26 | | 52 + 26 | | 26 | 1 |
| 65 | 26 | | 26 + 52 | | 26 | 52 | | 52 | | 1 |

TABLE 7

| | | | | | | | | | | |
|---|---|---|---|---|---|---|---|---|---|---|
| 66 | 52 | | 26 | 26 | 26 | | 52 + 26 | | 26 | 1 |
| 67 | 52 | | | 52 | 26 | | 52 + 26 | | 26 | 1 |
| 68 | 52 | | | 52 + 26 | | | 52 | | 52 | 1 |
| 69 | 26 | 26 | 26 | 26 | | | 26 + 106 | | | 1 |
| 70 | 26 | | 26 + 52 | | 26 | | | 106 | | 1 |
| 71 | 26 | 26 | | 52 | | | 26 + 106 | | | 1 |
| 72 | 26 | | 26 + 52 | | | | 26 + 106 | | | 1 |
| 73 | 52 | | 26 | 26 | | | 26 + 106 | | | 1 |
| 74 | 52 | | | 52 | | | 26 + 106 | | | 1 |
| 75 | | | 106 + 26 | | | 26 | 26 | 26 | 26 | 1 |
| 76 | | | 106 + 26 | | | 26 | 26 | | 52 | 1 |
| 77 | | | 106 + 26 | | | | 52 | 26 | 26 | 1 |
| 78 | | 106 | | | 26 | | 52 + 26 | | 26 | 1 |
| 79 | | | 106 + 26 | | | | 52 + 26 | | 26 | 1 |
| 80 | | | 106 + 26 | | | | 52 | | 52 | 1 |
| 81 | | | 106 + 26 | | | | | 106 | | 1 |
| 82 | | 106 | | | | | 26 + 106 | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 13 may be used for improving automatic gain control estimation in a multiple input multiple output (MIMO) environment or an OFDMA environment. An HE-LTF of FIG. 13 may be used for estimating a channel in the MIMO environment or the OFDMA environment.

A PPDU (e.g., EHT-PPDU) of FIG. 13 may be configured based on the example of FIG. 5 and FIG. 6.

For example, an EHT PPDU transmitted on a 20 MHz band, i.e., a 20 MHz EHT PPDU, may be configured based on the RU of FIG. 4. That is, a location of an RU of EHT-STF, EHT-LTF, and data fields included in the EHT PPDU may be determined as shown in FIG. 4.

An EHT PPDU transmitted on a 40 MHz band, i.e., a 40 MHz EHT PPDU, may be configured based on the RU of FIG. 5. That is, a location of an RU of EHT-STF, EHT-LTF, and data fields included in the EHT PPDU may be determined as shown in FIG. 5.

Since the RU location of FIG. 5 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 6 but the RU of FIG. 5 is repeated twice.

When the pattern of FIG. 5 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 5 is repeated several times.

The PPDU of FIG. 13 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 13. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2."

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0," the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 13. The PPDU of FIG. 13 may be used to transmit/receive frames of various types. For example, the PPDU of FIG. 13 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 13 may be used for a management frame. An example of the management frame may include a beacon frame, a (re-)association request frame, a (re-)association response frame, a probe request frame, and a probe response frame. For example, the PPDU of FIG. 13 may be used for a data frame. For example, the PPDU of FIG. 13 may be used to simultaneously transmit at least two or more of the control frame, the management frame, and the data frame.

Figure 14:
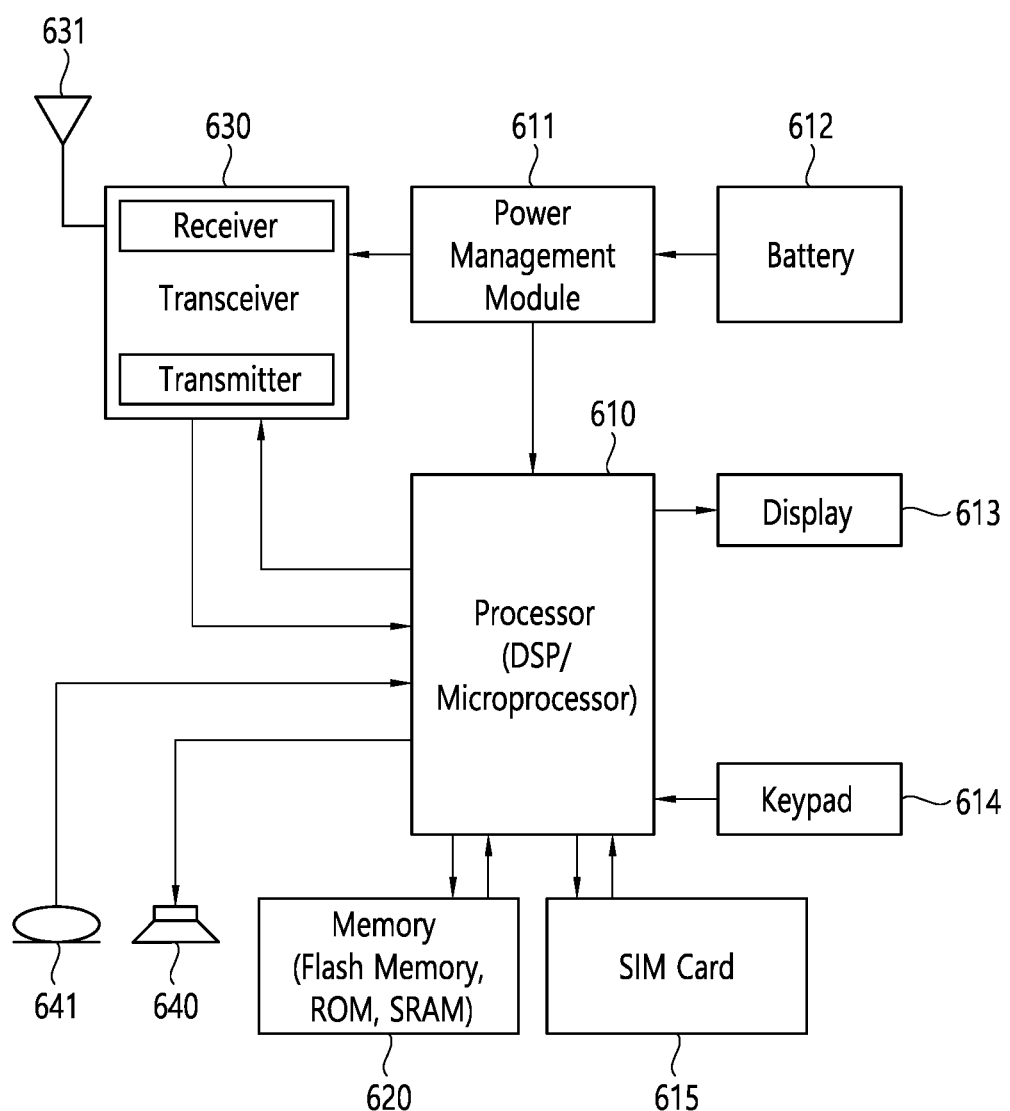
FIG. 14 illustrates an example of a modified transmission device and/or receiving device of the present specification.

FIG. 14 illustrates an example of a modified transmission device and/or receiving device of the present specification.

Each device/STA of the sub-figure (a)/(b) of FIG. 1 may be modified as shown in FIG. 14. A transceiver 630 of FIG. 14 may be identical to the transceivers 113 and 123 of FIG. 1. The transceiver 630 of FIG. 14 may include a receiver and a transmitter.

A processor 610 of FIG. 14 may be identical to the processors 111 and 121 of FIG. 1. Alternatively, the processor 610 of FIG. 14 may be identical to the processing chips 114 and 124 of FIG. 1.

A memory 620 of FIG. 14 may be identical to the memories 112 and 122 of FIG. 1. Alternatively, the memory 620 of FIG. 14 may be a separate external memory different from the memories 112 and 122 of FIG. 1.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 14, a speaker 640 may output a result related to a sound processed by the processor 610. A microphone 641 may receive an input related to a sound to be used by the processor 610.

Hereinafter, technical features applicable to the EHT standard will be described.

According to an embodiment of the present specification, the EHT standard may support PPDUs of 320 MHz bandwidth and 160+160 MHz. In addition, 240 MHz transmission and 160+80 MHz transmission may be supported. The 240 MHz transmission and 160+80 MHz transmission may be configured by applying 80 MHz preamble puncturing in 320 MHz bandwidth and 160+160 MHz bandwidth, respectively. For example, the 240 MHz bandwidth and 160+80 MHz bandwidth may be configured based on three 80 MHz channels including a primary 80 MHz (channel).

According to an embodiment of the present specification, the EHT standard may re-use a tone plan of the IEEE 802.11ax standard a 20/40/80/160/80+80 MHz PPDU. According to an embodiment, a 160 MHz OFDMA tone plan of the IEEE 802.11ax standard may be duplicated and used for 320 MHz and 160+160 MHz PPDUs.

According to an embodiment of the present specification, the transmission in 240 MHz and 160+80 MHz may consist of three 80 MHz segments. For example, the tone plan of each 80 MHz segment may be configured in the same manner as the 80 MHz tone plan of the IEEE 802.11ax standard.

According to an embodiment of the present specification, a 160 MHz tone plan may be duplicated and used for a non-OFDMA tone plan of a 320/160+160 MHz PPDU.

According to an embodiment of the present specification, a duplicated HE160 tone plan may be used for a 320/160+160 MHz PPDU non-OFDMA tone plan.

According to an embodiment of the present specification, in each 160 MHz segment for a non-OFDMA tone plan of a 320/160+160 MHz PPDU, 12 and 11 null tones may be configured on the leftmost side and the rightmost side, respectively.

According to an embodiment of the present specification, the data part of the EHT PPDU may use the same subcarrier spacing as the data part of the IEEE 802.11ax standard.

Hereinafter, technical features of a resource unit (RU) applicable to the EHT standard will be described.

According to an embodiment of the present specification, in the EHT standard, one or more RUs may be allocated to a single STA. For example, coding and interleaving schemes for multiple RUs allocated to a single STA may be variously set.

According to an embodiment of the present specification, small-size RUs may be aggregated with other small-size RUs. According to an embodiment of the present specification, large-size RUs may be aggregated with other large-size RUs.

For example, RUs of 242 tones or more may be defined/set as 'large size RUs'. For another example, RUs of less than 242 tones may be defined/configured as 'small size RUs'.

According to an embodiment of the present specification, there may be one PSDU per STA for each link. According to an embodiment of the present specification, for LDPC encoding, one encoder may be used for each PSDU.

Small-Size RUs

According to an embodiment of the present specification, an aggregation of small-size RUs may be set so as not to cross a 20 MHz channel boundary. For example, RU106+RU26 and RU52+RU26 may be configured as an aggregation of small-size RUs.

According to an embodiment of the present specification, in PPDUs of 20 MHz and 40 MHz, contiguous RU26 and RU106 may be aggregated/combined within a 20 MHz boundary.

According to an embodiment of the present specification, in PPDUs of 20 MHz and 40 MHz, RU26 and RU52 may be aggregated/combined.

For example, in 20 MHz (or 20 MHz PPDU), an example of contiguous RU26 and RU52 may be shown through FIG. 21.

Figure 15:
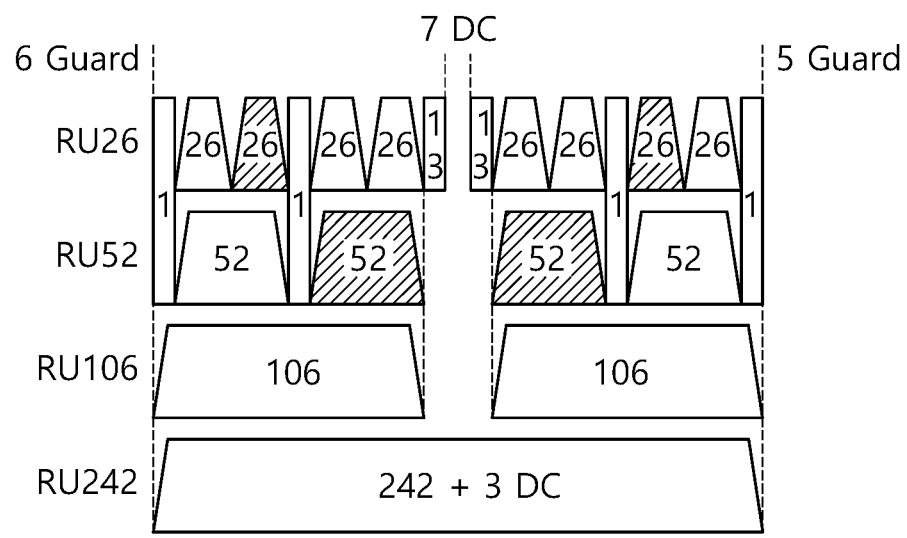
FIG. 15 shows an example of an aggregation of RU26 and RU52 in 20 MHz.

FIG. 15 shows an example of an aggregation of RU26 and RU52 in 20 MHz.

Referring to FIG. 15, shaded RU26 and RU52 may be aggregated. For example, the second RU26 and the second RU52 may be aggregated. For another example, the seventh RU and the third RU52 may be aggregated.

Figure 16:
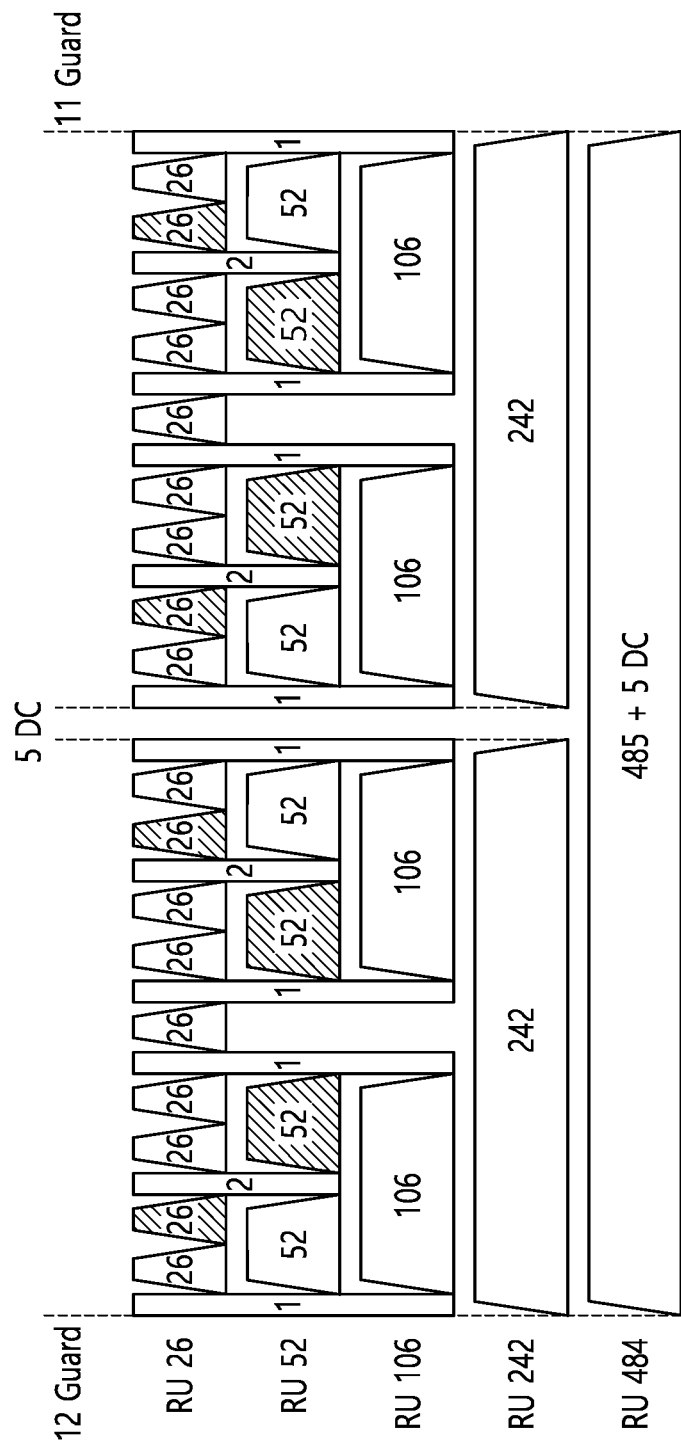
FIG. 16 shows an example of an aggregation of RU26 and RU52 in 40 MHz.

For example, in 40 MHz, an example of contiguous RU26 and RU52 is described in FIG. 16.

FIG. 16 shows an example of an aggregation of RU26 and RU52 in 40 MHz.

Referring to FIG. 16, shaded RU26 and RU52 may be aggregated. For example, the second RU26 and the second RU52 may be aggregated. For another example, the eighth RU26 and the third RU52 may be aggregated. For another example, the eleventh RU26 and the sixth RU52 may be aggregated. For another example, the seventeenth RU26 and the seventh RU52 may be aggregated.

According to an embodiment of the present specification, RU26 and RU52 may be aggregated/combined in a PPDU of 80 MHz.

Figure 17:
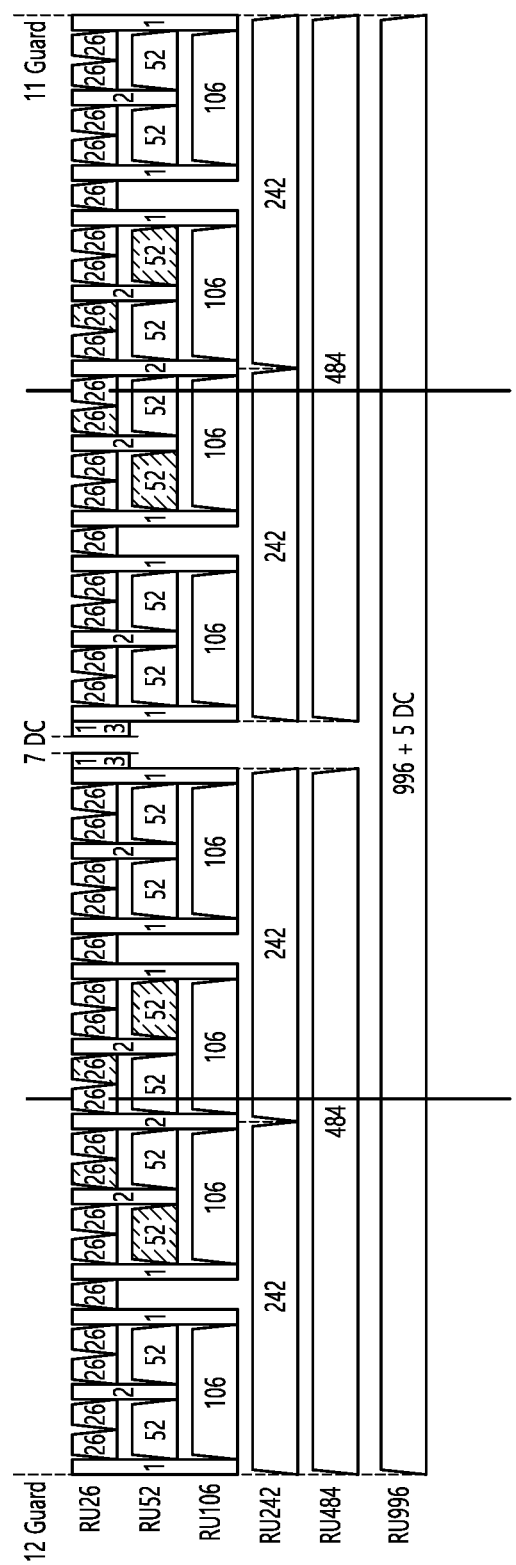
FIG. 17 shows an example of an aggregation of RU26 and RU52 in 80 MHz.

For example, an example of contiguous RU26 and RU52 in 80 MHz may be shown by FIG. 17.

FIG. 17 shows an example of an aggregation of RU26 and RU52 in 80 MHz.

Referring to FIG. 17, 80 MHz may be divided into the first 40 MHz and the second 40 MHz. For example, within the first 40 MHz, the 8th RU26 and the 3rd RU52 may be aggregated. For another example, within the first 40 MHz, the 11th RU26 and the 6th RU52 may be aggregated. For another example, within the second 40 MHz, the 8th RU26 and the 3rd RU52 may be aggregated. For another example, within the second 40 MHz, the 11th RU26 and the 6th RU52 may be aggregated.

According to an embodiment, when LDPC coding is applied, a single tone mapper may be used for RUs having less than 242 tones.

Large-Size RUs

According to an embodiment, in OFDMA transmission of 320/160+160 MHz for a single STA, an aggregation of a large-size RUs may be allowed only within a primary 160 MHz or a secondary 160 MHz. For example, the primary 160 MHz (channel) may consist of a primary 80 MHz (channel) and a secondary 80 MHz (channel). The secondary 160 MHz (channel) can be configured with channels other than the primary 160 MHz.

According to an embodiment, in OFDMA transmission of 240 MHz for a single STA, a aggregated of large-size RUs may be allowed only within 160 MHz (band/channel), and the 160 MHz may consist of two adjacent 80 MHz channels.

According to an embodiment, in OFDMA transmission of 160+80 MHz for a single STA, an aggregation of large-size RUs may be allowed only within a continuous 160 MHz (band/channel) or within the remaining 80 MHz (band/channel).

In 160 MHz OFDMA, an aggregation of large-size RUs configured as shown in Table 8 may be supported.

TABLE 8

| RU size | Aggregate BW | Notes |
|---|---|---|
| 484 + 996 | 120 MHz | 4 options |

In 80 MHz OFDMA, an aggregation of large-size RUs configured as shown in Table 9 may be supported.

TABLE 9

| RU size | Aggregate BW | Notes |
| --- | --- | --- |
| 484 + 242 | 60 MHz | 4 options |

In 80 MHz non-OFDMA, an aggregation of large-size RUs configured as shown in Table 10 may be supported. In 80 MHz non-OFDMA, puncturing can be applied. For example, one of four 242 RUs may be punctured.

TABLE 10

| RU size | Aggregate BW | Notes |
| --- | --- | --- |
| 484 + 242 | 60 MHz | 4 options |

In 160 MHz non-OFDMA, an aggregation of large-size RUs configured as shown in Table 11 may be supported. In 160 MHz non-OFDMA, puncturing can be applied. For example, one of eight 242 RUs may be punctured. For another example, one of four 484 RUs may be punctured.

TABLE 11

| 80 MHz RU Size | 80 MHz RU size | Aggregate BW | Notes |
| --- | --- | --- | --- |
| 484 | 996 | 120 MHz | 4 options |
| 484 + 242 | 996 | 140 MHz | 8 options |

In 240 MHz non-OFDMA, an aggregation of large-size RUs configured as shown in Table 12 may be supported. In 240 MHz non-OFDMA, puncturing can be applied. For example, one of six 484 RUs may be punctured. For another example, one of three 996 RUs may be punctured.

TABLE 12

| 80 MHz RU size | 80 MHz RU size | 80 MHz RU size | Aggregate BW | Notes |
| --- | --- | --- | --- | --- |
| 484 | 996 | 996 | 200 MHz | 6 options |
| — | 996 | 996 | 160 MHz | 3 options |

In 320 MHz non-OFDMA, an aggregation of large-size RUs configured as shown in Table 13 may be supported. In 320 MHz non-OFDMA, puncturing can be applied. For example, one of eight 484 RUs may be punctured. For another example, one of four 996 RUs may be punctured.

TABLE 13

| 80 MHz RU size | 80 MHz RU size | 80 MHz RU size | 80 MHz RU size | Aggregate BW | Notes |
| --- | --- | --- | --- | --- | --- |
| 484 | 996 | 996 | 996 | 280 MHz | 8 options |
| — | 996 | 996 | 996 | 240 MHz | 4 options |

Hereinafter, technical features related to the operating mode will be described.

According to an embodiment, a station (STA) supporting the EHT standard STA (hereinafter, "EHT STA") or a station (STA) supporting the EHT standard STA (hereinafter, "HE STA") may operate in a 20 MHz channel width mode. In the 20 MHz channel width mode, the EHT STA may operate by reducing the operating channel width to 20 MHz using an operating mode indication (OMI).

According to an embodiment, the EHT STA (or HE STA) may operate in an 80 MHz channel width mode. For example, in the 80 MHz channel width mode, the EHT STA may operate by reducing the operating channel width to 80 MHz using an operating mode indication (OMI).

According to an embodiment, the EHT STA may support subchannel selective transmission (SST). An STA supporting the SST can quickly select (and switch to) another channel between transmissions to cope with fading in a narrow subchannel.

The 802.11be standard (i.e., the EHT standard) can provide a higher data rate than the 802.11ax standard. The EHT (i.e., extreme high throughput) standard can support wide bandwidth (up to 320 MHz), 16 streams, and multi-band operation.

In the EHT standard, various preamble puncturing or multiple RU allocation may be supported in wide bandwidth (up to 320 MHz) and SU/MU transmission. In addition, in the EHT standard, a signal transmission/reception method through 80 MHz segment allocation is considered in order to support an STA with low end capability (e.g., 80 MHz only operating STA). Accordingly, in the following specification, a method of configuring/transmitting an EHT-SIG for the MU transmission in consideration of subchannel selective transmission (SST) defined in the 11ax standard and Multi-RU aggregation may be proposed.

EHT PPDU Configuration

In order to support a transmission method based on the EHT standard, a new frame format may be used. When transmitting a signal through the 2.4/5/6 GHz band based on the new frame format, conventional Wi-Fi receivers (or STAs) (e.g., 802.11n) as well as receivers supporting the EHT standard receivers in compliance with the 802.11n/ac/ax standard) can also receive EHT signals transmitted through the 2.4/5/6 GHz band.

The preamble of the PPDU based on the EHT standard can be set in various ways. Hereinafter, an embodiment of configuring the preamble of the PPDU based on the EHT standard will be described. Hereinafter, a PPDU based on the EHT standard may be described as an EHT PPDU. However, the EHT PPDU is not limited to the EHT standard. The EHT PPDU may include not only the 802.11be standard (i.e., the EHT standard), but also a PPDU based on a new standard that is improved/evolved/extended with the 802.11be standard.

FIG. 18 shows an example of an EHT PPDU.

Referring to FIG. 18, an EHT PPDU 1800 may include an L-part 1810 and an EHT-part 1820. The EHT PPDU 1800 may be configured in a format to support backward compatibility. In addition, the EHT PPDU 1800 may be transmitted to a single STA and/or multiple STAs. The EHT PPDU 1800 may be an example of an MU-PPDU of the EHT standard.

The EHT PPDU 1800 may include the L-part 1810 preceding the EHT-part 1820 for coexistence or backward compatibility with a legacy STA (e.g., STA in compliance with the 802.11n/ac/ax standard). For example, the L-part 1810 may include L-STF, L-LTF, and L-SIG. For example, phase rotation may be applied to the L-part 1810.

According to an embodiment, the EHT part 1820 may include RL-SIG, U-SIG 1821, EHT-SIG 1822, EHT-STF, EHT-LTF, and data fields. Similar to the 11ax standard, RL-SIG may be included in the EHT part 1820 for L-SIG reliability and range extension. The RL-SIG may be transmitted immediately after the L-SIG, and may be configured to repeat the L-SIG.

For example, four additional subcarriers may be applied to L-SIG and RL-SIG. The extra subcarriers may be configured at subcarrier indices [−28, −27, 27, 28]. The extra subcarriers may be modulated in a BPSK scheme. In addition, coefficients of [−1 −1 −1 1] may be mapped to the extra subcarriers.

For example, the EHT-LTF may be one of 1×EHT-LTF, 2×EHT-LTF, or 4×EHT-LTF. The EHT standard may support EHT-LTF for 16 spatial streams.

According to an embodiment, the U-SIG 1821 may include a version independent field and a version dependent field. An example of the U-SIG 1821 may be described with reference to FIG. 19.

FIG. 19 shows an example of U-SIG.

Referring to FIG. 19, U-SIG 1900 may correspond to the U-SIG 1821 of FIG. 18. The U-SIG 1900 may include a version independent field 1910 and a version dependent field 1920.

According to an embodiment, the version independent field 1910 may include a version identifier of 3 bits indicating an EHT standard and/or a Wi-Fi version after the EHT standard. In other words, the version independent field 1910 may include 3 bits of information related to the EHT standard and/or the Wi-Fi version after the EHT standard.

According to an embodiment, the version independent field 1910 may further include a 1-bit DL/UL field, a BSS color field, and/or a TXOP duration field. In other words, the version independent field 1910 may further include 1-bit information related to DL/UL, information related to the BSS color, and/or information related to the TXOP duration.

According to an embodiment, the version dependent field 1920 may include a field/information related to a PPDU format type, a field/information related to a bandwidth, and/or a field/information related to an MCS. For example, the field/information on the bandwidth may include puncturing information.

According to an embodiment, the U-SIG 1900 may consist of two symbols. The two symbols may be jointly encoded. According to an embodiment, the U-SIG 1900 may be configured based on 52 data tones and 4 pilot tones for each 20 MHz (channel/band). In addition, it may be modulated in the same manner as HE-SIG-A of the HE standard. For example, the U-SIG 1900 may be modulated based on BPSK and a code rate of ½.

According to an embodiment, the U-SIG 1900 may be duplicated over each 20 MHz channel/band when transmitting in a wide bandwidth.

According to an embodiment, when transmitted to multiple users, the U-SIG 1900 may further include MCS information of the EHT-SIG or information related to the number of symbols of the EHT-SIG.

Referring back to FIG. 18, the EHT-SIG 1822 may include a version dependent field that is not included in the U-SIG 1821. In other words, the EHT-SIG 1822 may include information overflowed from the U-SIG 1821. For example, the EHT-SIG 1822 may include information dependent on the version of the PPDU. For another example, the EHT-SIG 1822 may include at least one field that was included in HE-SIG-A of the HE standard.

According to an embodiment, the EHT-SIG 1822 may be configured based on a plurality of OFDM symbols. According to an embodiment, the EHT-SIG 1822 may be modulated with various MCS levels. For example, the EHT-SIG 1822 may be modulated based on MCS0 to MCS5.

According to an embodiment, the EHT-SIG 1822 may include a common field and a user specific field. For example, the common field may include information related to spatial streams and/or information related to RU allocation. For example, the user specific field may include at least one user block field including information related to a user. The user specific field may include/indicate information related to ID information, MCS, and coding used for a specific user or STA. For example, the user specific field may include at least one user block field.

In the following specification, RU aggregation (or preamble puncturing pattern) that can be used in the EHT standard may be described.

Small Size of RU Aggregation

An example of aggregation of small-size RUs may be configured as shown in Tables 14 to 16.

TABLE 14

| Index | 1 | 2 | 3 | 4 | 5 | 6 | 7 | 8 | 9 |
|---|---|---|---|---|---|---|---|---|---|
| 1 | 26 | | 26 + 52 | | 26 | 26 | 26 | 26 | 26 |
| 2 | 26 | | 26 + 52 | | 26 | 26 | 26 | | 52 |
| 3 | 26 | | 26 + 52 | | 26 | | 52 | 26 | 26 |
| 4 | 26 | | 26 + 52 | | 26 | | 52 | | 52 |
| 5 | 26 | | 26 + 52 | | 26 | | | 106 | |
| 6 | 26 | 26 | 26 | 26 | 26 | | 52 + 26 | | 26 |
| 7 | 26 | 26 | | 52 | | 26 | 26 + 52 | | 26 |
| 8 | 52 | | 26 | 26 | 26 | | 26 + 52 | | 26 |
| 9 | 52 | | | 52 | | 26 | 26 + 52 | | 26 |
| 10 | | | 106 | | | 26 | 26 + 52 | | 26 |
| 11 | 26 | | 26 + 52 | | 26 | | 26 + 52 | | 26 |

Table 14 shows an example in which 26 RU and 52 RU are aggregated. The element "26+52" in Table 14 may indicate that 26 RU and 52 RU are aggregated to form a multiple RU (MRU).

TABLE 15

| index | 1 | 2 | 3 | 4 | 5 | 6 | 7 | 8 | 9 |
|---|---|---|---|---|---|---|---|---|---|
| 1 | 26 | 26 | 26 | 26 | | | 26 + 106 | | |
| 2 | 26 | 26 | | 52 | | | 26 + 106 | | |
| 3 | | 52 | | 26 | 26 | | 26 + 106 | | |
| 4 | | 52 | | | 52 | | 26 + 106 | | |
| 5 | | | 106 | | | | 26 + 106 | | |
| 6 | | 106 + 26 | | | | 26 | 26 | 26 | 26 |
| 7 | | 106 + 26 | | | | 26 | 26 | | 52 |
| 8 | | 106 + 26 | | | | | 52 | 26 | 26 |
| 9 | | 106 + 26 | | | | | 52 | | 52 |
| 10 | | 106 + 26 | | | | | | 106 | |

Table 15 shows an example in which 26 RU and 106 RU are aggregated. The element "26+106" in Table 15 may indicate that 26 RU and 106 RU are aggregated to form a multiple RU (MRU).

TABLE 16

| index | 1 | 2 | 3 | 4 | 5 | 6 | 7 | 8 | 9 |
|---|---|---|---|---|---|---|---|---|---|
| 1 | | | 106 + 26 | | | | 52 + 26 | | 26 |
| 2 | 26 | | 26 + 52 | | | | 26 + 106 | | |

Table 16 shows an example in which 26 RU and 52 RU may be aggregated, and 26 RU and 106 RU may be aggregated. The element "26+52" may indicate that 26 RU and 52 RU are aggregated to form a multiple RU (MRU), and the element "26+106" may indicate that 26 RU and 106 RU are aggregated to form a multiple RU (MRU).

Large Size of RU Aggregation

An example of aggregation of large-size RUs may be configured as shown in FIGS. 20 and 21.

FIG. 20 shows an example of RU aggregation.

Referring to FIG. 20, RU aggregation may be configured as indices 1 to 4 in an 80 MHz bandwidth. The shaded portion may represent an aggregated RU.

FIG. 21 shows an example of RU aggregation.

Referring to FIG. 21, RU aggregation may be configured as indices 1 to 4 in a 160 MHz bandwidth. The shaded portion may represent an aggregated RU.

As described above, RU allocation for 11be OFDMA transmission may be configured as follows in consideration of allocation for additional multiple RU aggregation and the number of supportable total spatial streams (max up to 16).

1. In the EHT standard, the RU allocation field for OFDMA transmission may be configured with 10-bit.

2. In this case, 1 bit of MSB of the RU allocation field having a length of 10-bits may be used to determine whether or not allocation for multiple RU aggregations is performed.

2-A. In this case, the MSB 1 bit can be used as follows.

2-A-i. When the MSB 1 bit of RU allocation bit is set to 0, the RU allocation field may represent (or indicate) that information included in the RU allocation field is information about general RU allocation that does not include information about multiple RU aggregation.

2-A-ii. When the MSB 1 bit of RU allocation bit is set to 1, the RU allocation field may represent (or indicate) that information included in the RU allocation field is information about RU allocation for multiple RU aggregation.

2-B. As in the above-described embodiment, based on the MSB 1 bit of the RU allocation bit, the STA may quickly determine (or confirm) whether the information on the allocated RU is MRU aggregation.

3. In the above-described embodiment, when 1 bit of RU allocation MSB is set to 0, the RU allocation table may be configured as shown in Equation 1.

$$RU \text{ allocation field}=[0,8\text{-bit},X1] \quad \text{[Equation 1]}$$

3-A. Referring to Equation 1, the MSB of the RU allocation subfield may be set to 0. The 8-bit after the MSB may be configured in the same manner as the RU allocation field of the flax standard. X1 in Equation lean be used to indicate additional information.

3-A-i. As described above, when MRU allocation is not included, RU allocation bits of the 11ax standard composed of 8-bit may be used. In addition, since 1-bit is added to an 8-bit allocation bit in order to support an increased allocation case according to an increase in the number of supported NSSs, an increased number of entries may be indicated.

3-A-ii. For example, when the configuration of the allocated RU is [52 52 106], the RU allocation field may be configured as follows in consideration of the maximum supported NSS (i.e., 16).

3-A-ii-1. The allocation field for the configuration of the allocated RU may be set to "00010 y2 y1 y0." In the EHT standard, LSB 1 bit (x1) is added so that the RU allocation field may be configured as shown in Equation 2.

$$RU \text{ allocation information}="000010y2y1y0x1" \quad \text{[Equation 2]}$$

Referring to Equation 2, signaling for multiple user transmission considering max 16 spatial streams may be performed based on "y2 y1 y0 x1."

3-B. RU allocation information (RU allocation information in the RU allocation field) may be configured as shown in FIGS. 22 to 25. When the MSB 1 bit is set to 0, the RU allocation information may be configured by reusing 8 bit allocation information of the 11ax standard.

FIGS. 22 to 25 show examples of RU allocation information in the RU allocation field.

Referring to FIGS. 22 to 25, signaling (e.g., y2y1y0w1 and x4x3x2x1x0w1) for an RU size of 106 RU or more in the tables of FIGS. 22 to 25 may indicate the number of users multiplexed to the allocated RU. The number of users multiplexed to the allocated RU can be calculated as follows.

For example, "y2 y1 y0 w1" may represent the number of users multiplexed to the allocated RU (i.e., N_user Multiplexed in allocated RU). The N_user Multiplexed in allocated RU may be configured as in Equation 3.

$$N\_user \text{ Multiplexed in allocated } RU=2^3xy2+2^2xy1+2^1xy0+w1+1 \quad \text{[Equation 3]}$$

For example, "x4 x3 x2 x1 x0 w1" may represent the number of users multiplexed to the allocated RU (i.e., N_user Multiplexed in allocated RU). The N_user Multiplexed in allocated RU can be configured as shown in Equation 4.

$$N\_user \text{ Multiplexed in allocated } RU=2^5xx4+2^4xx3+2^3xx2+2^2xx1+2^1xx0+w1+1 \quad \text{[Equation 4]}$$

In addition, the tables shown in FIGS. 22 to 25 may include allocation for 2x996 for indication for 160 MHz. When RU allocation is used by allocating 106 RUs without an intermediate 26 RU, 4 MU-MIMO users may be considered for the 106 RUs in the same manner as in the 11ax standard. In other words, when only 106 RUs are allocated without 26 RU in the middle of the bandwidth (i.e., 0110 y1 y0 z1 z0), 4 MU-MIMO users may be used for the 106 RUs.

3-C. Unlike the above-described embodiment, when a signal is transmitted by applying MU-MIMO in RUs having more than 106 tones, the maximum supportable Nss per user may be set to 8. Therefore, when the RU allocation is [106-106], Nss may be set to a maximum of 64, and thus an additional indication scheme may be required.

Therefore, in the RU allocation table, increased entries may be indicated by using the reserved bit "0111 x4 x3 x2 x1 x0 w1". In this case, the RU allocation information may be configured as shown in FIGS. 26 to 29.

FIGS. 26 to 29 show examples of RU allocation information in the RU allocation field.

Referring to FIGS. 26 to 29, up to 64 users may be indicated by the last "0111 x4 x3 x2 x1 x0 w1" in the tables of FIGS. 26 to 29.

3-D. Allocation bits applied to RU allocation following [106 26 106] in FIGS. 26 to 29 may be configured as shown in FIG. 30.

FIG. 30 shows an example of RU allocation information in the RU allocation field.

Referring to FIG. 30, a table additionally configured to the tables of FIGS. 26 to 29 is shown. In addition to the tables of FIGS. 26 to 29, the table of FIG. 30 shows an example of an allocation bit configuration for RU allocation following [106 26 106].

4-A/B. Allocation for the MRU may be signaled using RU allocation information as shown in FIGS. 31 and 32.

FIGS. 31 and 32 show examples of RU allocation information in the RU allocation field.

Referring to FIGS. 31 and 32, allocation for MRU may be indicated using a value of MSB (i.e., 1-bit) among RU allocation information bits (i.e., 10-bit). In this case, the value of the MSB may be set to 1.

In the tables of FIGS. 31 and 32, signaling for an RU having 106 RU or more (i.e., x3x2x1x0 and y5y4y3y2y1y0)

may indicate the number of users multiplexed to the allocated RU. The number of users multiplexed to the allocated RU can be calculated as follows.

For example, "x3 x2 x1 x0" may represent the number of users multiplexed to the allocated RU (i.e., N_user Multiplexed in allocated RU). The N_user Multiplexed in allocated RU may be configured as shown in Equation 5.

$$N\text{\_user Multiplexed in allocated }RU=2^3 x x3+2^2 x x2+2^1 x x1+x0+1 \quad \text{[Equation 5]}$$

For example, "y5 y4 y3 y2 y1 y0" may represent the number of users multiplexed to the allocated RU (i.e., N_user Multiplexed in allocated RU). The N_user Multiplexed in allocated RU may be configured as in Equation 6.

$$N\text{\_user Multiplexed in allocated }RU=2^3 x x3+2^2 x x2+2^1 x x1+x0+ \quad \text{[Equation 6]}$$

4-C. The tables of FIGS. 31 and 32 may additionally include information related to an aggregation of large-size RUs or preamble puncturing for Non-OFDMA transmission. Information related to the aggregation of large-size RUs or preamble puncturing may be indicated using reserved bits in the tables of FIGS. 31 and 32.

4-C-i. In 240 MHz, a case (or option) of the aggregation of large-size RUs or preamble puncturing may be configured as shown in FIG. 33.

FIG. 33 shows an example of an aggregation of large-size RUs or preamble puncturing.

Referring to FIG. 33, in order to indicate 9 cases including "6 options" and "3 options" in FIG. 33, "01101 x3 x2 x1 x0", which is a reserved bit of the tables of FIGS. 31 and 32 described above, may be used. RU allocation information (or MRU allocation information) of the EHT-SIG content channel (CC) included in the corresponding RU may be set to the same value. An example in which "01101 x3 x2 x1 x0" in the tables of FIGS. 31 and 32 described above is used for exemplary purposes, and reserved bits different from other reserved bits may be used to indicate the 9 cases.

4-C-ii. In 320 MHz, a case (or option) of an aggregation of large-size RUs or preamble puncturing may be configured as shown in FIG. 34.

FIG. 34 shows an example of an aggregation of large-size of RUs or preamble puncturing.

Referring to FIG. 34, in order to indicate 12 cases including "8 options" and "4 options" in FIG. 34, "01110 x3 x2 x1 x0", which is a reserved bit of the tables of FIGS. 31 and 32 described above, may be used. RU allocation information (or MRU allocation information) of the EHT-SIG content channel (CC) included in the corresponding RU may be set to the same value. An example in which "01110 x3 x2 x1 x0" in the tables of FIGS. 31 and 32 is used for exemplary purposes, and reserved bits different from other reserved bits may be used to indicate the 12 cases.

5. Bits in the above table represent one embodiment, and different allocation information from may be indicated by using the above table.

6. The elements "26+52" and "52+26" in the above embodiments may represent the same RU aggregation.

7. In the above embodiments, the elements "26+106" and "106+26" may represent the same RU aggregation.

8. Like the RU allocation configuration of the above embodiments, the RU allocation information/field may include information related to other 80 MHz segments. For example, the RU allocation field may be transmitted through one EHT-SIG CC included in the allocated 80 MHz segment. The STA may obtain (or confirm) information related to MRU included in another 80 MHz segment based on the RU allocation field in the allocated 80 MHz segment.

9. Unlike the above-described embodiments, eight MU-MIMO users may be supported in the same manner as the 11ax standard, and MU-MIMO may be supported only when the RU size is 242 or more. In this case, the RU allocation information bit may be configured as 8-bit.

9-A. According to an embodiment, as the RU allocation subfield of the EHT standard, an RU allocation subfield of the same size as the 11ax standard may be used. In this case, there is an effect of reducing additional signaling overhead.

9-B. Among 8 bits used for RU allocation, MSB 1-bit can be used to distinguish whether RU allocation is for single RU allocation or multiple RU allocation. In other words, the MSB 1-bit among the 8-bit may include information for distinguishing whether RU allocation is single RU allocation or multiple RU allocation.

9-B-i. According to an embodiment, information related to an aggregation of Large-size RUs having more than 996 tones (e.g., 996+484 or 3×996) may be included in RU allocation. In this case, RU allocation information not included in the allocated segment may be indicated (or transmitted).

9-B-ii. For example, 8-bit RU allocation information/subfield may be configured as shown in FIGS. 35 to 39.

FIGS. 35 to 39 show examples of RU allocation information in the RU allocation field.

9-B-iii. Referring to FIGS. 35 to 39, bit tables in FIGS. 35 to 39 may not include: a) 2×996-tone RU: contributes zero User fields to the User Specific field in the same HE-SIG-B content channel as this RU Allocation subfield; and b) 3×996-tone R; contributes zero User fields to the User Specific field in the same HE-SIG-B content channel as this RU Allocation subfield.

9-B-iv. The 2×996-tone RU indication and/or 3×996-tone RU indication in the above bit table may not be used when there is a full bandwidth MIMO or common field in 160 MHz and 240 MHz transmissions.

9-B-v. The indication for 4×996 in the bit table may be included in single RU (SRU) allocation.

9-B-vi. The above bit ordering is shown for exemplary purposes, and a bit order for an allocated RU indication may be set differently from the above bit table.

9-B-vii. According to the above-described embodiment, since the RU allocation can be configured by 8-bit, there is an effect of reducing signaling overhead for MRU indication.

9-B-viii. The 8-bit table is shown for exemplary purposes, and RU allocation may be configured in 8-bit including information on both SRU and MRU allocation without SRU/MRU parsing bits.

Hereinafter, operations of the transmitting STA and the receiving STA according to the above-described embodiments will be described.

Figure 40:
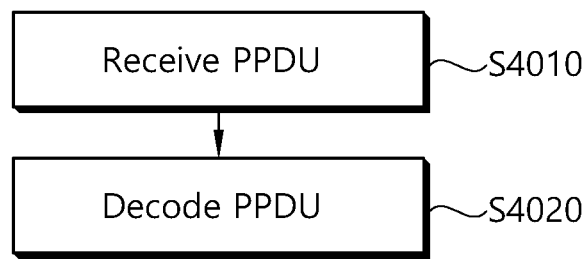
FIG. 40 is a flowchart illustrating an operation of a receiving STA.

FIG. 40 is a flowchart illustrating an operation of a receiving STA.

Referring to FIG. 40, in 54010, a receiving STA may receive a PPDU. According to an embodiment, the receiving STA may receive a PPDU including a first signal field and a second signal field. For example, the first signal field may include the U-SIG. For example, the second signal field may include the EHT-SIG.

For example, each of the first signal field and the second signal field may be encoded. For example, in the first signal field, two symbols may be jointly encoded. In addition, the first signal field and the second signal field may be separately modulated.

According to an embodiment, the PPDU may further include a legacy signal field and a repeated legacy signal field in addition to the first signal field and the second signal field. For example, the repeated legacy signal field may be contiguous to the legacy signal field. The first signal field may be contiguous to the repeated legacy signal field. The second signal field may be contiguous to the first signal field.

For example, a value of the length field of the legacy signal field may be set based on a transmission time of the PPDU. For example, the result of "modulo 3 operation" on the value of the length field of the legacy signal field may be set to 0.

For example, the repeated legacy signal field may be configured to duplicate the legacy signal field. As an example, the repeated legacy signal field includes the same information field as the legacy signal field, and may be modulated in the same manner. Each of the legacy signal field and the repeated legacy signal field may be modulated through BPSK.

According to an embodiment, the first signal field may include information related to a version of the PPDU. Information related to the version of the PPDU may be determined based on whether the PPDU is an EHT PPDU. For example, the information related to the version of the PPDU may consist of 3-bit information. That is, the first signal field may include 3-bit information related to the version of the PPDU. For example, the receiving STA may determine the version of the PPDU as the version related to the EHT standard based on the 3-bit information.

The information on the version of the PPDU may include information indicating that the PPDU is a PPDU configured based on the EHT standard (i.e., EHT PPDU). In addition, the information related to the version of the PPDU may include information for classifying a PPDU according to a next generation standard defined after the 802.11be standard (i.e., the EHT standard). In other words, the information on the version of the PPDU may include information for classifying the PPDU according to the EHT standard and/or the standard determined/generated/established after the EHT standard. That is, the information related to the version of the PPDU may include information indicating that the PPDU is an EHT standard or a PPDU after the EHT standard.

The type of the PPDU and the version of the PPDU may be used separately. The type of PPDU can be used to classify PPDUs according to the EHT standard and/or the standard before the EHT standard (e.g., 802.11n/ac/ax). On the other hand, the version of the PPDU can be used to classify the PPDU according to the EHT standard and the standard after the EHT standard. For example, the version of the PPDU can be called variously. For example, the version of the PPDU may be referred to as a PHY version, a packet version, a packet identifier, and a Wi-Fi version.

According to an embodiment, the second signal field may include 10-bit information for indicating configurations of a plurality of resource units (RUs). For example, a first bit information of the 10-bit information may include information for determining a configuration of the plurality of RUs as one of a first configuration and a second configuration. For example, the first bit information may include most significant bit (MSB) information of the 10-bit information.

The first configuration may be configured to be a single resource unit (SRU). The second configuration may be configured to be a multiple resource unit (MRU). For example, in the first configuration, each of the plurality of RUs may be configured to be the SRU. In other words, the plurality of RUs may be configured without being aggregated. For example, in the second configuration, each of the RUs may be configured to be the MRU. In other words, at least one of the plurality of RUs may be aggregated.

For example, based on the first bit information being set to a first value (e.g., 0), the configuration of the plurality of RUs may be set to be the first configuration. When the first bit information is set to a first value, a table for the SRU may be configured based on 9-bit information excluding the first bit information among 10-bit information. As an example, the table for the SRU may be set based on the table for the 11ax standard resource unit (RU). In other words, the 11ax standard resource unit table may consist of 8-bit information, and the 11ax standard resource unit table may be used as it is for a single resource unit (SRU) table.

Accordingly, among the 10-bit information, the first bit information may be used to indicate the configuration of a plurality of RUs. In addition, a table related to a RU of 11ax standard may be configured based on 8-bit information among 10-bit information. A table related to a single resource unit (SRU) added in the EHT standard may be additionally configured based on the remaining 1-bit information excluding the first bit information and the 8-bit information among 10-bit information. In this case, there is an advantageous effect that the 11ax standard resource unit table can be re-used.

For another example, based on the first bit information being the second value (e.g., 1), the configuration of the plurality of RUs may be set to be the second configuration.

According to an embodiment, the second signal field may include a common field and a user specific field. For example, 10-bit information may be included in the common field.

According to an embodiment, in order to transmit information related to the number of users allocated to a plurality of RUs, at least one bit of the 10-bit information may be used. For example, in order to transmit information related to the number of users allocated to a plurality of RUs, at least one of 3-bit information to 6-bit information among 10-bit information may be used.

For example, the second to seventh bits of the 10-bit information may include information related to the number of users allocated to a plurality of RUs. For example, a plurality of users may be allocated to each of a plurality of RUs based on MU-MIMO. Accordingly, the second to seventh bits may be used to indicate the number of users allocated to a plurality of RUs. For example, the second to fourth bits may be composed of "y5 y4 y3 y2 y1 y0". The bit y5 may mean the second bit. The bit y4 may mean the third bit. The bit y3 may mean the fourth bit. The bit y2 may mean the fifth bit. The bit y1 may mean the sixth bit. The bit y0 may mean the seventh bit. The number of users allocated to the plurality of resource units may be set as shown in Equation 7.

$$N\_User\ Multiplexed\ in\ Allocated\ RU = 2^5 xy5 + 2^4 xy4 + 2^3 xy3 + 2^2 xy2 + 2^1 xy1 + y0 + 1 \quad \text{[Equation 7]}$$

According to an embodiment, at least one user (or multiple users) may be allocated to a RU having 242 tones or more among a plurality of RUs. In other words, among the plurality of RUs, multiple users may be supported only in an RU having 242 tones or more. For example, four users may be allocated to one RU having 242 tones or more (e.g., 242, 484, 996, 242+484 or 484+996 tones, etc.).

For example, the maximum number of users allocated to a resource unit (RU) having 242 tones or more among a plurality of RUs may be set to one of 8 or 16. For example, the maximum number of users that can be allocated to 242 RUs may be set to 8.

In S4020, the receiving STA may decode the PPDU based on the first signal field and the second signal field. For example, the receiving STA may determine the version of the PPDU as the version related to the EHT standard based on the first signal field. The receiving STA may determine the configuration of the plurality of resource units to be one of the first configuration and the second configuration, based on the second signal field. In addition, the receiving STA may check a resource unit allocated to itself based on the second signal field.

Figure 41:
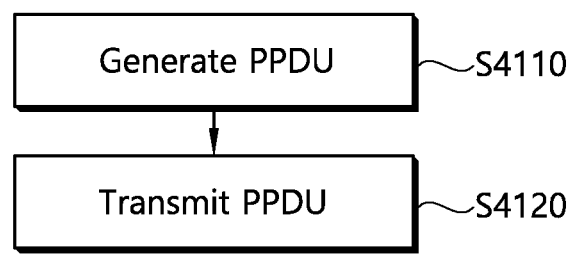
FIG. 41 is a flowchart illustrating an operation of a transmitting STA.

FIG. 41 is a flowchart illustrating an operation of a transmitting STA.

Referring to FIG. 41, in S4110, a transmitting STA may generate a physical layer protocol data unit (PPDU).

According to an embodiment, the transmitting STA may receive a PPDU including a first signal field and a second signal field. For example, the first signal field may include the U-SIG. For example, the second signal field may include the EHT-SIG.

For example, each of the first signal field and the second signal field may be encoded. For example, in the first signal field, two symbols may be jointly encoded. In addition, the first signal field and the second signal field may be separately modulated.

According to an embodiment, the PPDU may further include a legacy signal field and a repeated legacy signal field in addition to the first signal field and the second signal field. For example, the repeated legacy signal field may be contiguous to the legacy signal field. The first signal field may be contiguous to the repeated legacy signal field. The second signal field may be contiguous to the first signal field.

For example, a value of the length field of the legacy signal field may be set based on a transmission time of the PPDU. For example, the result of "modulo 3 operation" on the value of the length field of the legacy signal field may be set to 0.

For example, the repeated legacy signal field may be configured to duplicate the legacy signal field. As an example, the repeated legacy signal field includes the same information field as the legacy signal field, and may be modulated in the same manner. Each of the legacy signal field and the repeated legacy signal field may be modulated through BPSK.

According to an embodiment, the first signal field may include information related to a version of the PPDU. Information related to the version of the PPDU may be determined based on whether the PPDU is an EHT PPDU. For example, the information related to the version of the PPDU may consist of 3-bit information. That is, the first signal field may include 3-bit information related to the version of the PPDU. For example, the receiving STA may determine the version of the PPDU as the version related to the EHT standard based on the 3-bit information.

The information on the version of the PPDU may include information indicating that the PPDU is a PPDU configured based on the EHT standard (i.e., EHT PPDU). In addition, the information related to the version of the PPDU may include information for classifying a PPDU according to a next generation standard defined after the 802.11be standard (i.e., the EHT standard). In other words, the information on the version of the PPDU may include information for classifying the PPDU according to the EHT standard and/or the standard determined/generated/established after the EHT standard. That is, the information related to the version of the PPDU may include information indicating that the PPDU is an EHT standard or a PPDU after the EHT standard.

The type of the PPDU and the version of the PPDU may be used separately. The type of PPDU can be used to classify PPDUs according to the EHT standard and/or the standard before the EHT standard (e.g., 802.11n/ac/ax). On the other hand, the version of the PPDU can be used to classify the PPDU according to the EHT standard and the standard after the EHT standard. For example, the version of the PPDU can be called variously. For example, the version of the PPDU may be referred to as a PHY version, a packet version, a packet identifier, and a Wi-Fi version.

According to an embodiment, the second signal field may include 10-bit information for indicating configurations of a plurality of resource units (RUs). For example, a first bit information of the 10-bit information may include information for determining a configuration of the plurality of RUs as one of a first configuration and a second configuration. For example, the first bit information may include most significant bit (MSB) information of the 10-bit information.

The first configuration may be configured to be a single resource unit (SRU). The second configuration may be configured to be a multiple resource unit (MRU). For example, in the first configuration, each of the plurality of RUs may be configured to be the SRU. In other words, the plurality of RUs may be configured without being aggregated. For example, in the second configuration, each of the RUs may be configured to be the MRU. In other words, at least one of the plurality of RUs may be aggregated.

For example, based on the first bit information being set to a first value (e.g., 0), the configuration of the plurality of RUs may be set to be the first configuration. When the first bit information is set to a first value, a table for the SRU may be configured based on 9-bit information excluding the first bit information among 10-bit information. As an example, the table for the SRU may be set based on the table for the 11ax standard resource unit (RU). In other words, the 11ax standard resource unit table may consist of 8-bit information, and the 11ax standard resource unit table may be used as it is for a single resource unit (SRU) table.

Accordingly, among the 10-bit information, the first bit information may be used to indicate the configuration of a plurality of RUs. In addition, a table related to a RU of 11ax standard may be configured based on 8-bit information among 10-bit information. A table related to a single resource unit (SRU) added in the EHT standard may be additionally configured based on the remaining 1-bit information excluding the first bit information and the 8-bit information among 10-bit information. In this case, there is an advantageous effect that the 11ax standard resource unit table can be re-used.

For another example, based on the first bit information being the second value (e.g., 1), the configuration of the plurality of RUs may be set to be the second configuration.

According to an embodiment, the second signal field may include a common field and a user specific field. For example, 10-bit information may be included in the common field.

According to an embodiment, in order to transmit information related to the number of users allocated to a plurality of RUs, at least one bit of the 10-bit information may be used. For example, in order to transmit information related to the number of users allocated to a plurality of RUs, at least one of 3-bit information to 6-bit information among 10-bit information may be used.

For example, the second to seventh bits of the 10-bit information may include information related to the number of users allocated to a plurality of RUs. For example, a plurality of users may be allocated to each of a plurality of RUs based on MU-MIMO. Accordingly, the second to seventh bits may be used to indicate the number of users allocated to a plurality of RUs. For example, the second to fourth bits may be composed of "y5 y4 y3 y2 y1 y0". The bit y5 may mean the second bit. The bit y4 may mean the third bit. The bit y3 may mean the fourth bit. The bit y2 may mean the fifth bit. The bit y1 may mean the sixth bit. The bit y0 may mean the seventh bit. The number of users allocated to the plurality of resource units may be set as shown in Equation 7.

According to an embodiment, at least one user (or multiple users) may be allocated to a RU having 242 tones or more among a plurality of RUs. In other words, among the plurality of RUs, multiple users may be supported only in an RU having 242 tones or more. For example, four users may be allocated to one RU having 242 tones or more (e.g., 242, 484, 996, 242+484 or 484+996 tones, etc.).

For example, the maximum number of users allocated to a resource unit (RU) having 242 tones or more among a plurality of RUs may be set to one of 8 or 16. For example, the maximum number of users that can be allocated to 242 RUs may be set to 8.

In S4120, the transmitting STA may transmit a PPDU. For example, the first signal field may be transmitted through two symbols. The second signal field may be transmitted through at least one symbol.

The above-described technical features can be applied to various devices and methods. For example, the technical features of the present specification described above may be performed/supported through the apparatus of FIGS. 1 and/or 19. For example, the technical features of the present specification described above may be applied only to a part of FIGS. 1 and/or 19. For example, the technical features of the present specification described above may be implemented based on the processing chips 114 and 124 of FIG. 1, or implemented based on the processors 111 and 121 and the memories 112 and 122 of FIG. 1, or implemented based on the processor 610 and the memory 620 of FIG. 19. For example, the apparatus of the present specification includes a processor and a memory connected to the processor, and the processor obtains a physical layer protocol data unit (PPDU) including a first signal field and a second signal field. The first signal field includes 3 bit information related to a version of the PPDU, the second signal field includes 10 bit information related to a configuration of a plurality of resource units (RUs), and first bit information of the 10 bit information includes information for determining the configuration as one of a first configuration and a second configuration. Further, the processor decodes the PPDU based on the first signal field and the second signal field.

Technical features of the present specification may be implemented based on a computer readable medium (CRM). For example, the CRM configured by the present specification includes instructions to perform operations comprising: receiving a physical layer protocol data unit (PPDU) including a first signal field and a second signal field, wherein the first signal field includes 3 bit information related to a version of the PPDU, the second signal field includes 10 bit information related to a configuration of a plurality of resource units (RUs), and first bit information of the 10 bit information includes information for determining the configuration as one of a first configuration and a second configuration; and decoding the PPDU based on the first signal field and the second signal field. At least one processor related to the CRM of the present specification may be the processors 111 and 121 of FIG. 1 or the processing chips 114 and 124 of FIG. 1, or the processor 610 of FIG. 19.

Meanwhile, the CRM of the present specification may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims set forth herein may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a Wireless Local Area Network (WLAN) system, the method performed by a station (STA) comprising:
   receiving an extremely high throughput (EHT) Physical layer Protocol Data Unit (PPDU) including a legacy signal (L-SIG) field, a repeated legacy signal (RL-SIG) field being contiguous to the L-SIG field, a universal signal (U-SIG) field being contiguous to the RL-SIG field, and an EHT signal (EHT-SIG) field being contiguous to the U-SIG field,
   wherein the L-SIG field includes a length field, and the length field has a value satisfying that a remainder is zero when the length field is divided by three,
   wherein the RL-SIG field includes same control information as the L-SIG field,
   wherein the U-SIG field includes two contiguous symbols,
   wherein the U-SIG field includes version independent bits and version dependent bits being contiguous to the version independent bits,
   wherein the version independent bits include 3 bit information related to a physical version of the EHT PPDU, 1 bit information related to an uplink/downlink (UL/DL) direction, a transmission opportunity (TXOP) information related to a TXOP duration, and a basic service set (BSS) color information related to a BSS identifier,
   wherein the EHT-SIG field includes a common field related to resource unit (RU) information and a user specific field related to a station (STA) identifier,
   wherein the common field includes an index field related to allocation of a plurality of resource units (RUs),
   wherein a first value of the index field identifies a first allocation pattern in which four contiguous 26-tone RUs and one 106+26-tone RU being contiguous to the four contiguous 26-tone RUs are allocated,
   wherein a second value of the index field identifies a second allocation pattern in which two contiguous 26-tone RUs, one 52-tone RU being contiguous to the two contiguous 26-tone RUs, and one 106+26-tone RU being contiguous to the one 52-tone RU are allocated,
   wherein a third value of the index field identifies a third allocation pattern in which one 52-tone RU, two contiguous 26-tone RUs being contiguous to the one 52-tone RU, and one 106+26-tone RU being contiguous to the two contiguous 26-tone RUs,
   wherein a fourth value of the index field identifies a fourth allocation pattern in which two contiguous 52-tone RUs and one 106+26-tone RU being contiguous to the two contiguous 52-tone RUs, and
   wherein the second value is contiguous to the first value, the third value is contiguous to the second value, and the fourth value is contiguous to the third value; and
   interpreting the EHT PPDU based on the U-SIG field and the EHT-SIG field.

2. The method of claim 1, wherein a fifth value of the index field identifies a fifth allocation pattern in which one 106+26-tone RU and four contiguous 26-tone RUs being contiguous to the one 106+26-tone RU are allocated,
   wherein a sixth value of the index field identifies a sixth allocation pattern in which one 106+26-tone RU, two contiguous 26-tone RUs being contiguous to the one 106+26-tone RU, and one 52-tone RU being contiguous to the two contiguous 26-tone RUs are allocated,
   wherein a seventh value of the index field identifies a seventh allocation pattern in which one 106+26-tone RU, one 52-tone RU being contiguous to the one 106+26-tone RU, and two contiguous 26-tone RUs being contiguous to the one 52-tone RU are allocated, and
   wherein an eighth value of the index field identifies an eighth allocation pattern in which one 106+26-tone RU and two contiguous 52-tone RUs being contiguous to the one 106+26-tone RU are allocated.

3. The method of claim 2, wherein the sixth value is contiguous to the fifth value, the seventh value is contiguous to the sixth value, and the eighth value is contiguous to the seventh value.

4. The method of claim 1, wherein the U-SIG field is duplicated for multiples 20 MHz channels, and one U-SIG field for one 20 MHZ channels is configured based on 52 data tones and 4 pilot tones.

5. A method in a Wireless Local Area Network (WLAN) system, the method performed by a station (STA) comprising:
   configuring an extremely high throughput (EHT) Physical layer Protocol Data Unit (PPDU) including a legacy signal (L-SIG) field, a repeated legacy signal (RL-SIG) field being contiguous to the L-SIG field, a universal signal (U-SIG) field being contiguous to the RL-SIG field, and an EHT signal (EHT-SIG) field being contiguous to the U-SIG field, wherein the L-SIG field includes a length field, and the length field has a value satisfying that a remainder is zero when the length field is divided by three, wherein the RL-SIG field includes same control information as the L-SIG field, wherein the U-SIG field includes two contiguous symbols, wherein the U-SIG field includes version independent bits and version dependent bits being contiguous to the version independent bits, wherein the version independent bits include 3 bit information related to a physical version of the EHT PPDU, 1 bit information related to an uplink/downlink (UL/DL) direction, a transmission opportunity (TXOP) information related to a TXOP duration, and a basic service set (BSS) color information related to a BSS identifier, wherein the EHT-SIG field includes a common field related to resource unit (RU) information and a user specific field related to a station (STA) identifier, wherein the common field includes an index field related to allocation of a plurality of resource units (RUs), wherein a first value of the index field identifies a first allocation pattern in which four contiguous 26-tone RUs and one 106+26-tone RU being contiguous to the four contiguous 26-tone RUs are allocated, wherein a second value of the index field identifies a second allocation pattern in which two contiguous 26-tone RUs, one 52-tone RU being contiguous to the two contiguous 26-tone RUs, and one 106+26-tone RU being contiguous to the one 52-tone RU are allocated, wherein a third value of the index field identifies a third allocation pattern in which one 52-tone RU, two contiguous 26-tone RUs being contiguous to the one 52-tone RU, and one 106+26-tone RU being contiguous to the two contiguous 26-tone RUs, wherein a fourth value of the index field identifies a fourth allocation pattern in which two contiguous 52-tone RUs and one 106+26-tone RU being contiguous to the two contiguous 52-tone RUs, and wherein the second value is contiguous to the first value, the third value is contiguous to the second value, and the fourth value is contiguous to the third value; and transmitting the EHT PPDU.

6. A receiving station (STA) in a Wireless Local Area Network (WLAN) system, the STA comprising:

a transceiver configured to transmit and receive a wireless signal; and a processor coupled to the transceiver, wherein the processor is configured to:

receive an extremely high throughput (EHT) Physical layer Protocol Data Unit (PPDU) including a legacy signal (L-SIG) field, a repeated legacy signal (RL-SIG) field being contiguous to the L-SIG field, a universal signal (U-SIG) field being contiguous to the RL-SIG field, and an EHT signal (EHT-SIG) field being contiguous to the U-SIG field, wherein the L-SIG field includes a length field, and the length field has a value satisfying that a remainder is zero when the length field is divided by three, wherein the RL-SIG field includes same control information as the L-SIG field, wherein the U-SIG field includes two contiguous symbols, wherein the U-SIG field includes version independent bits and version dependent bits being contiguous to the version independent bits, wherein the version independent bits include 3 bit information related to a physical version of the EHT PPDU, 1 bit information related to an uplink/downlink (UL/DL) direction, a transmission opportunity (TXOP) information related to a TXOP duration, and a basic service set (BSS) color information related to a BSS identifier, wherein the EHT-SIG field includes a common field related to resource unit (RU) information and a user specific field related to a station (STA) identifier, wherein the common field includes an index field related to allocation of a plurality of resource units (RUs), wherein a first value of the index field identifies a first allocation pattern in which four contiguous 26-tone RUs and one 106+26-tone RU being contiguous to the four contiguous 26-tone RUs are allocated, wherein a second value of the index field identifies a second allocation pattern in which two contiguous 26-tone RUs, one 52-tone RU being contiguous to the two contiguous 26-tone RUs, and one 106+26-tone RU being contiguous to the one 52-tone RU are allocated, wherein a third value of the index field identifies a third allocation pattern in which one 52-tone RU, two contiguous 26-tone RUs being contiguous to the one 52-tone RU, and one 106+26-tone RU being contiguous to the two contiguous 26-tone RUs, wherein a fourth value of the index field identifies a fourth allocation pattern in which two contiguous 52-tone RUs and one 106+26-tone RU being contiguous to the two contiguous 52-tone RUs, and wherein the second value is contiguous to the first value, the third value is contiguous to the second value, and the fourth value is contiguous to the third value; and interpret the EHT PPDU based on the U-SIG field and the EHT-SIG field.

7. The STA of claim 6, wherein a fifth value of the index field identifies a fifth allocation pattern in which one 106+26-tone RU and four contiguous 26-tone RUs being contiguous to the one 106+26-tone RU are allocated, wherein a sixth value of the index field identifies a sixth allocation pattern in which one 106+26-tone RU, two contiguous 26-tone RUs being contiguous to the one 106+26-tone RU, and one 52-tone RU being contiguous to the two contiguous 26-tone RUs are allocated, wherein a seventh value of the index field identifies a seventh allocation pattern in which one 106+26-tone RU, one 52-tone RU being contiguous to the one 106+26-tone RU, and two contiguous 26-tone RUs being contiguous to the one 52-tone RU are allocated, and wherein an eighth value of the index field identifies an eighth allocation pattern in which one 106+26-tone RU and two contiguous 52-tone RUs being contiguous to the one 106+26-tone RU are allocated.

8. The STA of claim 7, wherein the sixth value is contiguous to the fifth value, the seventh value is contiguous to the sixth value, and the eighth value is contiguous to the seventh value.

9. The STA of claim 6, wherein the U-SIG field is duplicated for multiples 20 MHz channels, and one U-SIG field for one 20 MHZ channels is configured based on 52 data tones and 4 pilot tones.

10. A transmission station (STA) in a Wireless Local Area Network (WLAN) system, the STA comprising:
a transceiver configured to transmit and receive a wireless signal; and
a processor coupled to the transceiver,
wherein the processor is configured to:
configure an extremely high throughput (EHT) Physical layer Protocol Data Unit (PPDU) including a legacy signal (L-SIG) field, a repeated legacy signal (RL-SIG) field being contiguous to the L-SIG field, a universal signal (U-SIG) field being contiguous to the RL-SIG field, and an EHT signal (EHT-SIG) field being contiguous to the U-SIG field,
wherein the L-SIG field includes a length field, and the length field has a value satisfying that a remainder is zero when the length field is divided by three,
wherein the RL-SIG field includes same control information as the L-SIG field,
wherein the U-SIG field includes two contiguous symbols,
wherein the U-SIG field includes version independent bits and version dependent bits being contiguous to the version independent bits,
wherein the version independent bits include 3 bit information related to a physical version of the EHT PPDU, 1 bit information related to an uplink/downlink (UL/DL) direction, a transmission opportunity (TXOP) information related to a TXOP duration, and a basic service set (BSS) color information related to a BSS identifier,
wherein the EHT-SIG field includes a common field related to resource unit (RU) information and a user specific field related to a station (STA) identifier,
wherein the common field includes an index field related to allocation of a plurality of resource units (RUs),
wherein a first value of the index field identifies a first allocation pattern in which four contiguous 26-tone RUs and one 106+26-tone RU being contiguous to the four contiguous 26-tone RUs are allocated,
wherein a second value of the index field identifies a second allocation pattern in which two contiguous 26-tone RUs, one 52-tone RU being contiguous to the two contiguous 26-tone RUs, and one 106+26-tone RU being contiguous to the one 52-tone RU are allocated,
wherein a third value of the index field identifies a third allocation pattern in which one 52-tone RU, two contiguous 26-tone RUs being contiguous to the one 52-tone RU, and one 106+26-tone RU being contiguous to the two contiguous 26-tone RUs,
wherein a fourth value of the index field identifies a fourth allocation pattern in which two contiguous 52-tone RUs and one 106+26-tone RU being contiguous to the two contiguous 52-tone RUs, and
wherein the second value is contiguous to the first value, the third value is contiguous to the second value, and the fourth value is contiguous to the third value; and
transmit the EHT PPDU.

11. An apparatus in a Wireless Local Area Network (WLAN) system, the apparatus comprising:
a processor: and
a memory coupled to the processor,
wherein the processor is configured to:
obtain an extremely high throughput (EHT) Physical layer Protocol Data Unit (PPDU) including a legacy signal (L-SIG) field, a repeated legacy signal (RL-SIG) field being contiguous to the L-SIG field, a universal signal (U-SIG) field being contiguous to the RL-SIG field, and an EHT signal (EHT-SIG) field being contiguous to the U-SIG field,
wherein the L-SIG field includes a length field, and the length field has a value satisfying that a remainder is zero when the length field is divided by three,
wherein the RL-SIG field includes same control information as the L-SIG field,
wherein the U-SIG field includes two contiguous symbols,
wherein the U-SIG field includes version independent bits and version dependent bits being contiguous to the version independent bits,
wherein the version independent bits include 3 bit information related to a physical version of the EHT PPDU, 1 bit information related to an uplink/downlink (UL/DL) direction, a transmission opportunity (TXOP) information related to a TXOP duration, and a basic service set (BSS) color information related to a BSS identifier,
wherein the EHT-SIG field includes a common field related to resource unit (RU) information and a user specific field related to a station (STA) identifier,
wherein the common field includes an index field related to allocation of a plurality of resource units (RUs),
wherein a first value of the index field identifies a first allocation pattern in which four contiguous 26-tone RUs and one 106+26-tone RU being contiguous to the four contiguous 26-tone RUs are allocated,
wherein a second value of the index field identifies a second allocation pattern in which two contiguous 26-tone RUs, one 52-tone RU being contiguous to the two contiguous 26-tone RUs, and one 106+26-tone RU being contiguous to the one 52-tone RU are allocated,
wherein a third value of the index field identifies a third allocation pattern in which one 52-tone RU, two contiguous 26-tone RUs being contiguous to the one 52-tone RU, and one 106+26-tone RU being contiguous to the two contiguous 26-tone RUs,
wherein a fourth value of the index field identifies a fourth allocation pattern in which two contiguous 52-tone RUs and one 106+26-tone RU being contiguous to the two contiguous 52-tone RUs, and
wherein the second value is contiguous to the first value, the third value is contiguous to the second value, and the fourth value is contiguous to the third value; and
interpret the EHT PPDU based on the U-SIG field and the EHT-SIG field.

* * * * *

UNITED STATES PATENT AND TRADEMARK OFFICE
CERTIFICATE OF CORRECTION

PATENT NO. : 11,671,943 B2  
APPLICATION NO. : 17/223974  
DATED : June 6, 2023  
INVENTOR(S) : Dongguk Lim et al.

Page 1 of 2

It is certified that error appears in the above-identified patent and that said Letters Patent is hereby corrected as shown below:

In the Claims

In Column 40, Line 19, Claim 1:
Delete "ous to the two contiguous 26-tone RUs" and insert --ous to the two contiguous 26-tone RUs are allocated--

In Column 40, Line 23, Claim 1:
Delete "two contiguous 52-tone RUs, and" and insert --two contiguous 52-tone RUs are allocated, and--

In Column 41, Line 37, Claim 5:
Delete "ous to the two contiguous 26-tone RUs" and insert --ous to the two contiguous 26-tone RUs are allocated--

In Column 41, Line 41, Claim 5:
Delete "two contiguous 52-tone RUs, and" and insert --two contiguous 52-tone RUs are allocated, and--

In Column 42, Line 30, Claim 6:
Delete "ous to the two contiguous 26-tone RUs" and insert --ous to the two contiguous 26-tone RUs are allocated--

In Column 42, Line 34, Claim 6:
Delete "two contiguous 52-tone RUs, and" and insert --two contiguous 52-tone RUs are allocated, and--

In Column 43, Line 51, Claim 10:
Delete "tiguous to the two contiguous 26-tone RUs" and insert --tiguous to the two contiguous 26-tone RUs are allocated--

In Column 43, Line 55, Claim 10:
Delete "tiguous to the two contiguous 52-tone RUs, and" and insert --tiguous to the two contiguous 52-tone RUs are allocated, and--

In Column 44, Line 50, Claim 11:
Delete "tiguous to the two contiguous 26-tone RUs" and insert --tiguous to the two contiguous 26-tone RUs are allocated--

Signed and Sealed this  
Twenty-ninth Day of April, 2025

Coke Morgan Stewart  
*Acting Director of the United States Patent and Trademark Office*

CERTIFICATE OF CORRECTION (continued)
U.S. Pat. No. 11,671,943 B2

In Column 44, Line 54, Claim 11:
Delete "tiguous to the two contiguous 52-tone RUs, and" and insert --tiguous to the two contiguous 52-tone RUs are allocated, and--